US011215982B2

(12) United States Patent
Urano et al.

(10) Patent No.: US 11,215,982 B2
(45) Date of Patent: Jan. 4, 2022

(54) VEHICLE REMOTE INSTRUCTION SYSTEM

(71) Applicant: TOYOTA JIDOSHA KABUSHIKI KAISHA, Toyota (JP)

(72) Inventors: Hiromitsu Urano, Numazu (JP); Sho Otaki, Yokohama (JP); Hojung Jung, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/006,231

(22) Filed: Aug. 28, 2020

(65) Prior Publication Data

US 2021/0072744 A1 Mar. 11, 2021

(30) Foreign Application Priority Data

Sep. 6, 2019 (JP) .............................. JP2019-163069

(51) Int. Cl.
  *G05D 1/00* (2006.01)
  *B60W 60/00* (2020.01)
  *H04W 4/024* (2018.01)

(52) U.S. Cl.
  CPC ....... *G05D 1/0011* (2013.01); *B60W 60/0027* (2020.02); *B60W 2556/45* (2020.02);
  (Continued)

(58) Field of Classification Search
  CPC ......... G05D 1/0011; G05D 2201/0213; B60W 60/0027; B60W 2756/10; B60W 2556/45; H04W 4/024
  See application file for complete search history.

(56) References Cited

U.S. PATENT DOCUMENTS

2018/0181118 A1\* 6/2018 Yoneda .............. G06K 9/00805
2019/0163176 A1\* 5/2019 Wang .................. G05D 1/0061

FOREIGN PATENT DOCUMENTS

JP  2018-077649 A  5/2018

OTHER PUBLICATIONS

English Translation of Publication KR 20140102923 A Author: Choi Sung Lim Title: Method, Apparatus, and System of Transmitting and Receiving Estimated Execution Time of M2M Device Management Command (Year: 2014).\*

(Continued)

*Primary Examiner* — James J Lee
*Assistant Examiner* — Steven Vu Nguyen
(74) *Attorney, Agent, or Firm* — Sughrue Mion, PLLC

(57) ABSTRACT

A vehicle remote instruction system includes a remote instruction point situation recognition unit that recognizes a remote instruction point situation on a target route based on the target route, position information, and map information, a recommended time acquisition unit that acquires a recommended time based on the remote instruction point situation and a type of a remote instruction, a remote instruction sending unit that sends the remote instruction to an autonomous driving vehicle, and a predicted time calculation unit that calculates a predicted time. The remote instruction sending unit sends a delay instruction to set a reflection time closer to the recommended time when the predicted time is earlier than the recommended time, and sends a preparation instruction to cause the autonomous driving vehicle to behave in response to the type of the remote instruction at an earlier time when the predicted time is later than the recommended time.

3 Claims, 18 Drawing Sheets

(52) U.S. Cl.
CPC . *B60W 2756/10* (2020.02); *G05D 2201/0213* (2013.01); *H04W 4/024* (2018.02)

(56) References Cited

OTHER PUBLICATIONS

U-Continue Date: Aug. 25, 2014 (Year: 2014).*
U.S. Appl. No. 16/939,175, filed Jul. 27, 2020 Inventors: Hiromitsu Urano, Sho Otaki, Hojung Jung.

* cited by examiner

FIG. 14
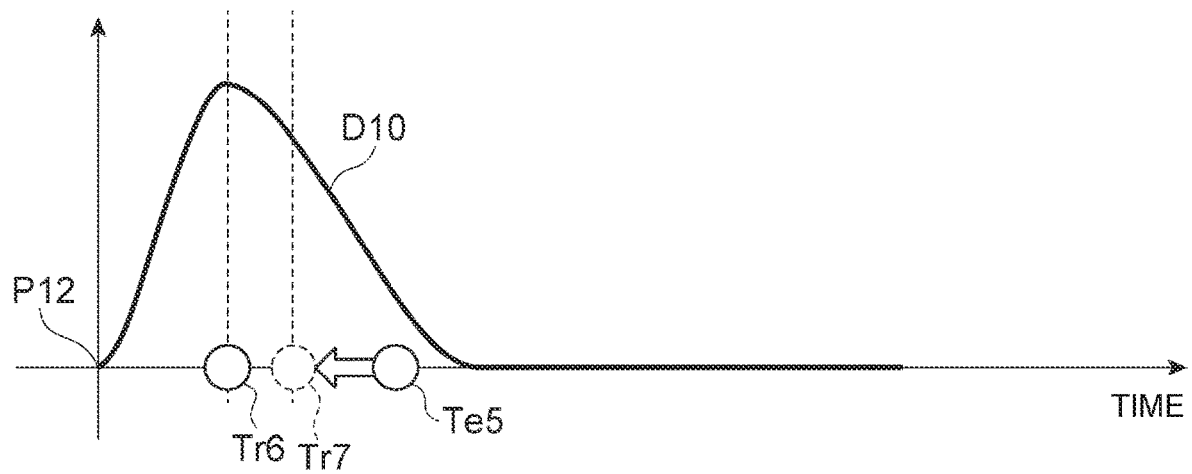
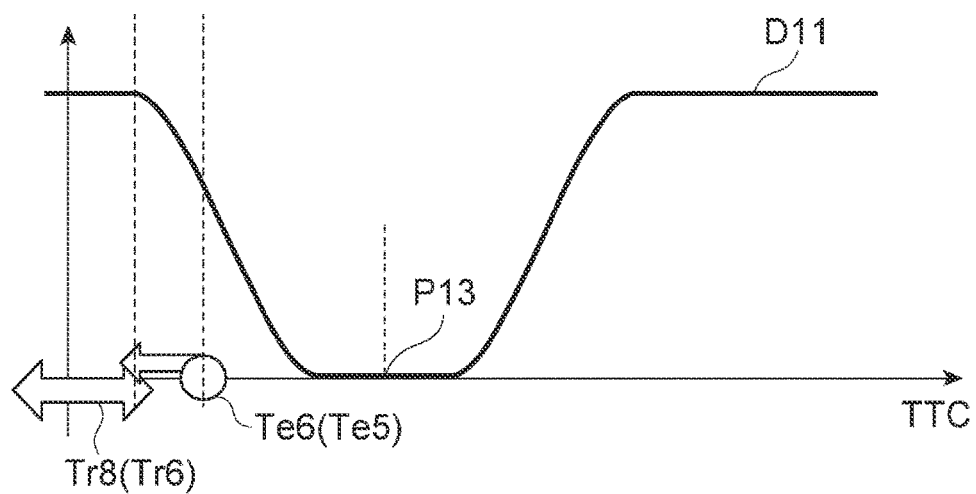
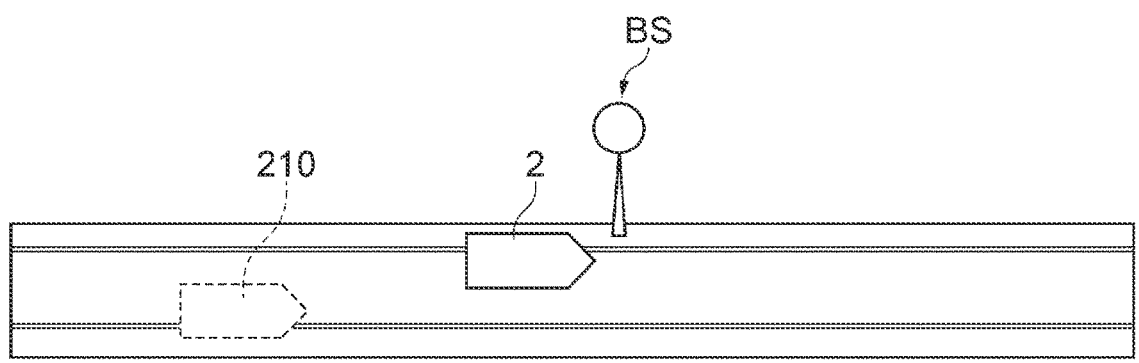

VEHICLE REMOTE INSTRUCTION SYSTEM

INCORPORATION BY REFERENCE

The disclosure of Japanese Patent Application No. 2019-163069 filed on Sep. 6, 2019 including the specification, drawings and abstract is incorporated herein by reference in its entirety.

BACKGROUND

1. Technical Field

The present disclosure relates to a vehicle remote instruction system.

2. Description of Related Art

Conventionally, Japanese Unexamined Patent Application Publication No. 2018-77649 (JP 2018-77649 A) is known as a technical publication relating to the remote operation of a vehicle. This publication discloses a vehicle control system in which a remote operator remotely operates a vehicle in response to a remote operation request sent from an autonomous driving vehicle. This vehicle control system includes a device used by a remote operator to remotely operate a vehicle by sending a steering amount of the steering wheel to the vehicle to steer its steering system according to the steering amount sent by the remote operator.

SUMMARY

There is a system in which a remote instruction, such as a proceed instruction or a stop instruction, is issued according to the situation of an autonomous driving vehicle and the autonomous driving vehicle travels autonomously according to the remote instruction. In such a system, there is a possibility that the time at which a remote instruction is reflected on an autonomous driving vehicle does not exactly match the time that is most appropriate for the external environment of the autonomous driving vehicle. For example, consider the case in which the same remote instruction is issued when the external environment is the same. In such a case, if the time at which the remote instruction is reflected on the behavior of the autonomous driving vehicle varies each time the remote instruction is issued, the occupants of the autonomous driving vehicle may feel discomfort.

Therefore, in this technical field, there is a need for a vehicle remote instruction system that can reduce a deviation of the reflection time, at which a remote instruction is reflected on an autonomous driving vehicle, from a time that suits the external environment of the autonomous driving vehicle.

A vehicle remote instruction system according to one aspect of the present disclosure relates to a vehicle remote instruction system in which a remote instruction for controlling an autonomous driving vehicle is sent. The vehicle remote instruction system includes a remote instruction point situation recognition unit, a recommended time acquisition unit, a remote instruction sending unit, and a predicted time calculation unit. The remote instruction point situation recognition unit is configured to recognize a remote instruction point situation on a target route of the autonomous driving vehicle based on the target route that is set in advance, position information on the autonomous driving vehicle, and map information. The recommended time acquisition unit is configured to acquire a recommended time. The recommended time is set in advance with a predetermined time from a start to an end of the remote instruction point situation as a reference point based on the remote instruction point situation and a type of the remote instruction. The remote instruction sending unit is configured to send the remote instruction to the autonomous driving vehicle. The predicted time calculation unit is configured to calculate a predicted time based on an external environment of the autonomous driving vehicle, the type of the remote instruction, and an instruction time of the remote instruction. The predicted time is a time at which the remote instruction is predicted to be reflected on the autonomous driving vehicle. When the predicted time is earlier than the recommended time, the remote instruction sending unit is configured to send a delay instruction to the autonomous driving vehicle. The delay instruction is an instruction that sets a reflection time closer to the recommended time by setting the reflection time later than the predicted time. The reflection time is a time at which the remote instruction is reflected on the autonomous driving vehicle. On the other hand, when the predicted time is later than the recommended time, the remote instruction sending unit is configured to send a preparation instruction to the autonomous driving vehicle. The preparation instruction is an instruction that causes the autonomous driving vehicle to behave in response to the type of the remote instruction at an earlier time.

According to the vehicle remote instruction system in one aspect of the present disclosure, the recommended time is set in advance based on a remote instruction point situation and the type of a remote instruction. The recommended time is a time at which the remote instruction is reflected on the autonomous driving vehicle and is an appropriate time that suits the external environment of the autonomous driving vehicle. In addition, the predicted time, at which the remote instruction is predicted to be reflected on the autonomous driving vehicle, is calculated based on the external environment of the autonomous driving vehicle, the type of the remote instruction, and the generation time or the sending time of the remote instruction. When the predicted time is earlier than the recommended time, the delay instruction is sent to set the reflection time, at which the remote instruction is reflected on the autonomous driving vehicle, closer to the recommended time than to the predicted time. As a result, the reflection time is set at a later time so that the reflection time is set closer to the recommended time when the delay instruction is sent than when the delay instruction is not sent. On the other hand, when the predicted time is later than the recommended time, the preparation instruction is sent to cause the autonomous driving vehicle to behave in response to the type of the remote instruction at an earlier time. As a result, the autonomous driving vehicle behaves in response to the type of the remote instruction at an earlier time when the preparation instruction is sent than when the preparation instruction is not sent. As a result, the reflection time is set closer to the recommended time. Therefore, it is possible to reduce a deviation of the reflection time, at which the remote instruction is reflected on the autonomous driving vehicle, from an appropriate time that suits the external environment of the autonomous driving vehicle.

In one embodiment, the vehicle remote instruction system may further include an instruction input unit and a commander database. The instruction input unit is a unit configured to allow a remote commander to enter the remote instruction according to a situation of the autonomous driving vehicle. The commander database is configured to store, in advance, commander tendency information in association with the remote commander. The commander tendency information is information regarding whether the remote commander tends to enter the remote instruction earlier than or later than the recommended time. The predicted time calculation unit may be configured to calculate the predicted time also based on the commander tendency information. In this case, since the predicted time is calculated based also on the commander tendency information, it is possible to reduce a deviation of the reflection time from the recommended time that is caused due to the remote commander tendency.

In one embodiment, the vehicle remote instruction system may further include a communication delay prediction unit. The communication delay prediction unit is configured to predict a communication delay corresponding to a remote instruction point situation based on the map information and the remote instruction point situation. The predicted time calculation unit may be configured to calculate the predicted time that includes the communication delay. In this case, since the calculation accuracy of the predicted time is increased, it is possible to further reduce a deviation of the reflection time from the recommended time.

According to one aspect or the other embodiments of the present disclosure, it is possible to reduce a deviation of the reflection time, at which a remote instruction is reflected on an autonomous driving vehicle, from the time that suits the external environment of the autonomous driving vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 14 is a diagram showing an example of the operation of a preparation instruction;

DETAILED DESCRIPTION OF EMBODIMENTS

Embodiments of the present disclosure will be described below with reference to the drawings.

First Embodiment

Figure 1:
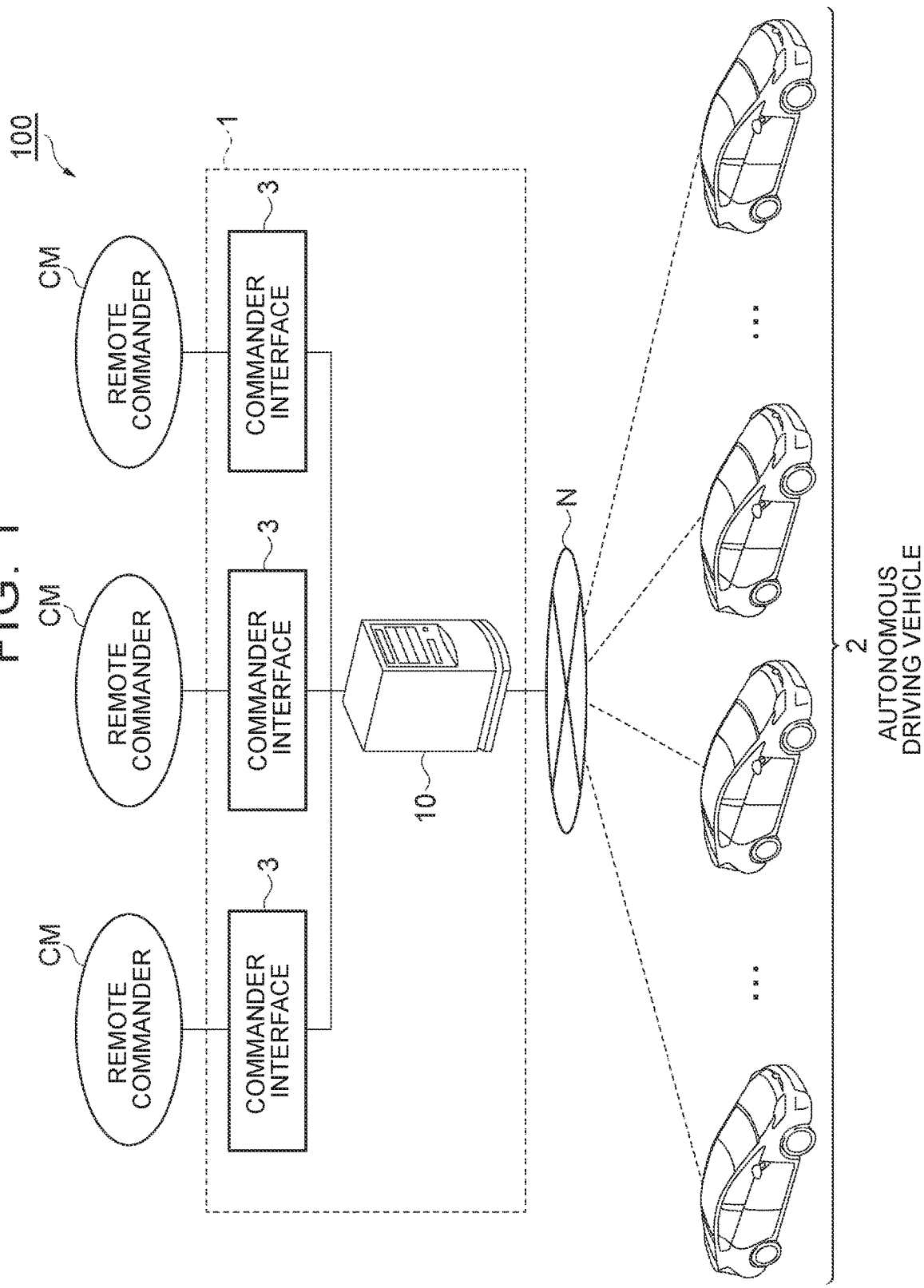
FIG. 1 is a block diagram showing an example of a vehicle remote instruction system according to a first embodiment.

FIG. 1 is a block diagram showing an example of a vehicle remote instruction system according to a first embodiment. A vehicle remote instruction system 100 shown in FIG. 1 is a system that sends a remote instruction to an autonomous driving vehicle 2 for controlling the autonomous driving vehicle 2. A remote instruction is an instruction that is remotely sent for controlling the travelling behavior of the autonomous driving vehicle 2.

The types of a remote instruction include an instruction to cause the autonomous driving vehicle 2 to proceed and an instruction to stop the autonomous driving vehicle 2. The types of a remote instruction may also include an instruction to change lanes of the autonomous driving vehicle 2, an instruction to pull over to the road shoulder, and an instruction to start turning right or left. The types of a remote instruction may also include an instruction to perform offset avoidance for an obstacle ahead, an instruction to pass a preceding vehicle, and an instruction to perform emergency evacuation. Other types of a remote instruction may include an instruction for an occupant to get in or out of the autonomous driving vehicle 2 (for example, an instruction to automatically open and close the door, an instruction to start voice guidance for getting out of the vehicle, and an instruction to extend or retract the platform for getting in and out of the vehicle). In the description below, a remote instruction is sent, for example, by a remote commander CM.

In the vehicle remote instruction system 100, the number of remote commanders CM is not limited. The number of remote commanders CM may be one or two or may be several tens. The number of the autonomous driving vehicles 2 that can communicate with the vehicle remote instruction system 100 is not particularly limited. A plurality of remote commanders CM may alternately send a remote instruction to one of the autonomous driving vehicles 2 and, conversely, one remote commander CM may send a remote instruction to two or more of the autonomous driving vehicles 2.

Configuration of Vehicle Remote Instruction System in First Embodiment

As shown in FIG. 1, the vehicle remote instruction system 100 includes a remote instruction device 1 through which remote commanders CM enter remote instructions. The remote instruction device 1 is communicably connected to a plurality of the autonomous driving vehicles 2 via a network N. The network N is a wireless communication network. Various types of information are sent from the autonomous driving vehicles 2 to the remote instruction device 1.

In the vehicle remote instruction system 100, the remote commander CM is requested to enter a remote instruction, for example, in response to a remote instruction request from the autonomous driving vehicle 2. The remote commander CM enters a remote instruction to a commander interface 3 of the remote instruction device 1. The remote instruction device 1 sends a remote instruction to the autonomous driving vehicle 2 through the network N. The autonomous driving vehicle 2 autonomously travels according to a remote instruction.

Configuration of Autonomous Driving Vehicle

Figure 2:
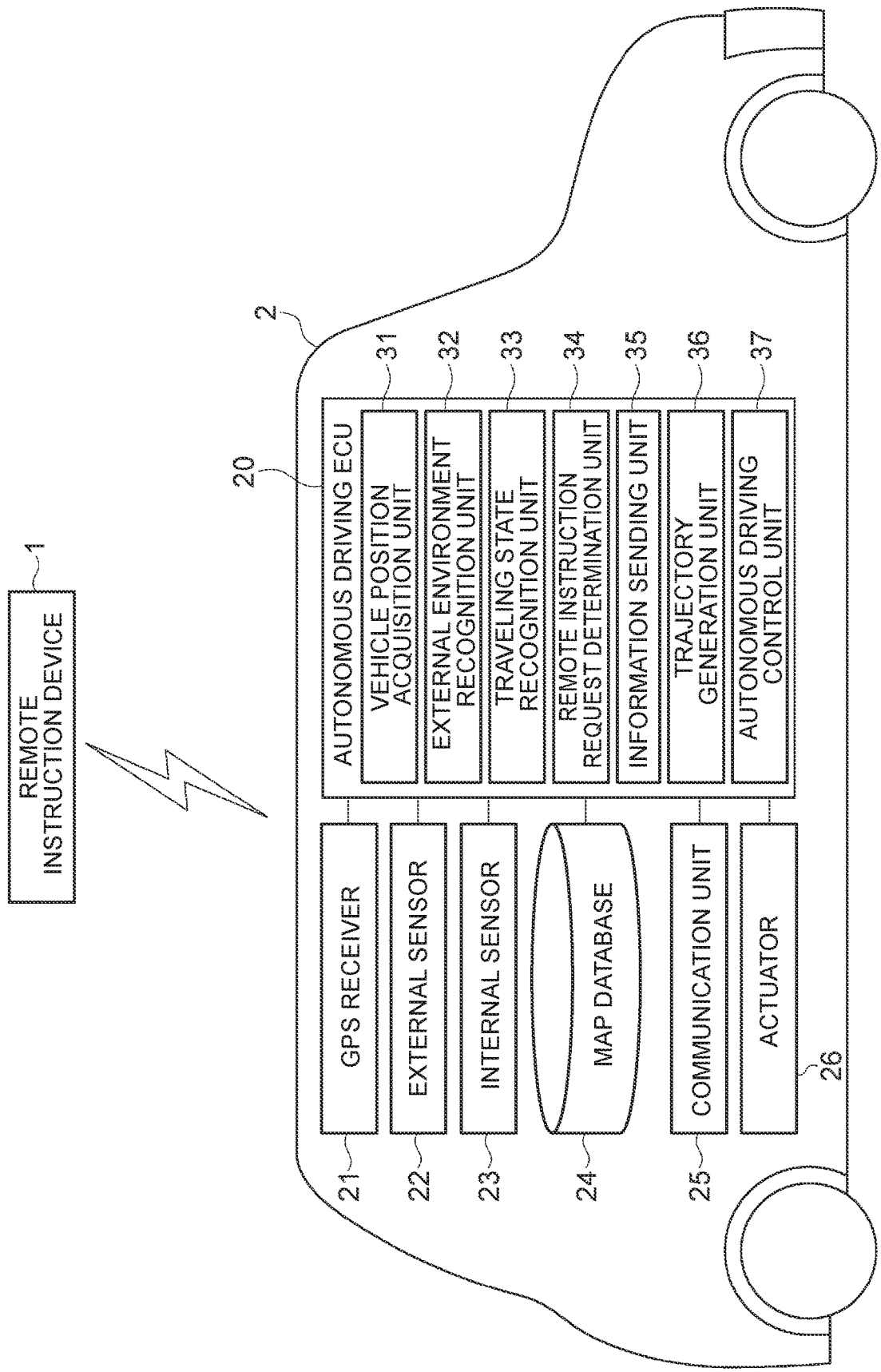
FIG. 2 is a block diagram showing an example of a configuration of an autonomous driving vehicle.

First, an example of a configuration of the autonomous driving vehicle 2 will be described. FIG. 2 is a block diagram showing an example of a configuration of the autonomous driving vehicle 2. As shown in FIG. 2, the autonomous driving vehicle 2, for example, has an autonomous driving ECU 20. The autonomous driving ECU 20 is an electronic control unit having a central processing unit (CPU), a read only memory (ROM), a random access memory (RAM), and the like. The autonomous driving ECU 20 loads a program, for example, from the ROM into the RAM and cause the CPU to execute the program, loaded into the RAM, to implement various functions. The autonomous driving ECU 20 may be configured by a plurality of electronic units.

The autonomous driving ECU 20 is connected to a Global Positioning System (GPS) receiver 21, an external sensor 22, an internal sensor 23, a map database 24, a communication unit 25, and an actuator 26.

The GPS receiver 21 measures the position of the autonomous driving vehicle 2 (for example, the latitude and longitude of the autonomous driving vehicle 2) by receiving signals from three or more GPS satellites. The GPS receiver 21 sends the measured position information on the autonomous driving vehicle 2 to the autonomous driving ECU 20.

The external sensor 22 is an in-vehicle sensor that detects the external environment of the autonomous driving vehicle 2. The external sensor 22 includes at least a camera. The camera is a capturing apparatus that captures the external environment of the autonomous driving vehicle 2. The camera is provided, for example, on the interior side of the windshield of the autonomous driving vehicle 2 to capture an image in front of the vehicle. The camera sends the captured information on the external environment of the autonomous driving vehicle 2 to the autonomous driving ECU 20. The camera may be a monocular camera or a stereo camera. A plurality of cameras may be provided to capture the images not only in front of the autonomous driving vehicle 2 but also in left and right sides of, and behind, the autonomous driving vehicle 2.

The autonomous driving vehicle 2 may be provided with an external camera for a remote commander. The external camera for a remote commander captures at least the image in front of the autonomous driving vehicle 2. The external camera for a remote commander may be configured by a plurality of cameras that capture the surroundings of the autonomous driving vehicle 2 including the sides of, and behind, the autonomous driving vehicle 2.

The external sensor 22 may include a radar sensor. The radar sensor is a detection apparatus that detects objects around the autonomous driving vehicle 2 using radio waves (for example, millimeter waves) or light. The radar sensor includes, for example, a millimeter-wave radar or a Light Detection and Ranging (Lidar). The radar sensor sends an electric wave or light to the surroundings of the autonomous driving vehicle 2 and detects an object by receiving the electric wave or light reflected by the object. The radar sensor sends the detected object information to the autonomous driving ECU 20. The objects that are detected include fixed objects such as guardrails and buildings, as well as moving objects such as pedestrians, bicycles, and other vehicles. Furthermore, the external sensor 22 may include a sonar sensor that detects a sound outside the autonomous driving vehicle 2.

The internal sensor 23 is an in-vehicle sensor that detects the traveling state of the autonomous driving vehicle 2. The internal sensor 23 includes a vehicle speed sensor, an acceleration sensor, and a yaw rate sensor. The vehicle speed sensor is a detector that detects the speed of the autonomous driving vehicle 2. As the vehicle speed sensor, a wheel speed sensor may be used. The wheel speed sensor is provided for the wheels of the autonomous driving vehicle 2, or for a drive shaft that rotates integrally with the wheels, for detecting the rotation speed of each wheel. The vehicle speed sensor sends the detected vehicle speed information (wheel speed information) to the autonomous driving ECU 20.

The acceleration sensor is a detector that detects the acceleration of the autonomous driving vehicle 2. The acceleration sensor includes, for example, a longitudinal acceleration sensor that detects the longitudinal acceleration of the autonomous driving vehicle 2. The acceleration sensor may include a lateral acceleration sensor that detects the lateral acceleration of the autonomous driving vehicle 2. For example, the acceleration sensor sends the acceleration information on the autonomous driving vehicle 2 to the autonomous driving ECU 20. The yaw rate sensor is a detector that detects the yaw rate (rotation angle speed) around the vertical axis of the center of gravity of the autonomous driving vehicle 2. For example, a gyro sensor may be used as the yaw rate sensor. The yaw rate sensor sends the detected yaw rate information on the autonomous driving vehicle 2 to the autonomous driving ECU 20.

The map database 24 is a database for storing map information. The map database 24 is built, for example, in a storage device such as a hard disk drive (HDD) mounted on the autonomous driving vehicle 2. The map information includes the position information on roads, the information on road shapes (for example, curvature information), and the position information on intersections and branch points. The map information may include the position information on bus stops. The map information may include the traffic regulation information such as the legal speed limits associated with the position information. The map information may include the target information used for acquiring the position information on the autonomous driving vehicle 2. As a target, a road sign, a road marking, a traffic light, a telephone pole, and the like may used. The map database 24 may be configured in a server that can communicate with the autonomous driving vehicle 2.

The communication unit 25 is a communication device that controls wireless communication with the outside of the autonomous driving vehicle 2. The communication unit 25 sends and receives various types of information to and from the remote instruction device 1 (remote instruction server 10) via the network N.

The actuator 26 is a device used for controlling the autonomous driving vehicle 2. The actuator 26 includes at least a drive actuator, a brake actuator, and a steering actuator. The drive actuator controls the amount of air supplied to the engine (throttle opening), for example, according to the control signal from the autonomous driving ECU 20 for controlling the driving force of the autonomous driving vehicle 2. When the autonomous driving vehicle 2 is a hybrid vehicle, the driving force is controlled not only by the amount of air supplied to the engine but also by the control signal that is sent from the autonomous driving ECU 20 to the motor that works as the power source. When the autonomous driving vehicle 2 is an electric vehicle, the driving force is controlled by the control signal that is sent from the autonomous driving ECU 20 to the motor that works as the power source. The motor that works as the power source in these cases constitutes the actuator 26.

The brake actuator controls the brake system according to the control signal from the autonomous driving ECU 20 for controlling the braking force applied to the wheels of the autonomous driving vehicle 2. For example, a hydraulic brake system can be used as the brake system. The steering actuator controls the driving of the assist motor, which controls the steering torque in the electric power steering system, according to the control signal received from the autonomous driving ECU 20. Thus, the steering actuator controls the steering torque of the autonomous driving vehicle 2.

Next, an example of a functional configuration of the autonomous driving ECU 20 will be described. The autonomous driving ECU 20 includes a vehicle position acquisition unit 31, an external environment recognition unit 32, a traveling state recognition unit 33, a remote instruction request determination unit 34, an information sending unit 35, a trajectory generation unit 36, and an autonomous driving control unit 37.

The vehicle position acquisition unit 31 acquires the position information (position on the map) on the autonomous driving vehicle 2 based on the position information obtained by the GPS receiver 21 and the map information stored in the map database 24. The vehicle position acquisition unit 31 may acquire the position information on the autonomous driving vehicle 2 by the Simultaneous Localization and Mapping (SLAM) technique, using the target information, included in the map information stored in the map database 24, and the detection result detected by the external sensor 22. The vehicle position acquisition unit 31 may recognize the lateral position of the autonomous driving vehicle 2 with respect to the lane (the position of the autonomous driving vehicle 2 in the lane width direction) from the positional relationship between the lane markings and the position of the autonomous driving vehicle 2 and may include the recognized lateral position in the position information. The vehicle position acquisition unit 31 may also acquire the position information on the autonomous driving vehicle 2 by a known method.

The external environment recognition unit 32 recognizes the external environment of the autonomous driving vehicle 2 based on the detection result of the external sensor 22. The external environment includes the positions of surrounding objects relative to the autonomous driving vehicle 2. The external environment may include the relative speed and the moving direction of a surrounding object with respect to the autonomous driving vehicle 2. The external environment may include types of objects such as other vehicles, pedestrians, and bicycles. The type of an object can be identified by a known method such as pattern matching. The external environment may include the result of recognition of the lane markings around the autonomous driving vehicle 2 (white line recognition). The external environment may include the recognition result of the lighting state of a traffic light. The external environment recognition unit 32 can recognize the lighting state of a traffic light in front of the autonomous driving vehicle 2 (whether autonomous driving vehicle 2 can pass the traffic light or must stop at the traffic light), for example, based on the image captured by the camera of the external sensor 22.

The traveling state recognition unit 33 recognizes the traveling state of the autonomous driving vehicle 2 based on the detection result of the internal sensor 23. The traveling state includes the vehicle speed of the autonomous driving vehicle 2, the acceleration of the autonomous driving vehicle 2, and the yaw rate of the autonomous driving vehicle 2. More specifically, the traveling state recognition unit 33 recognizes the vehicle speed of the autonomous driving vehicle 2 based on the vehicle speed information detected by the vehicle speed sensor. The traveling state recognition unit 33 recognizes the acceleration of the autonomous driving vehicle 2 based on the vehicle speed information detected by the acceleration sensor. The traveling state recognition unit 33 recognizes the direction of the autonomous driving vehicle 2 based on the yaw rate information detected by the yaw rate sensor.

The remote instruction request determination unit 34 determines whether the autonomous driving vehicle 2 should request a remote commander CM (remote instruction device 1) to send a remote instruction. The remote instruction request determination unit 34 determines whether a remote instruction should be requested based on at least one of the position information on the autonomous driving vehicle 2 acquired by the vehicle position acquisition unit 31 and the map information stored in the map database 24, the external environment recognized by the external environment recognition unit 32, and the trajectory generated by the trajectory generation unit 36 that will be described later.

The remote instruction request determination unit 34 determines that a remote instruction should be requested, for example, when the autonomous driving vehicle 2 is in a remote instruction point situation. A remote instruction point situation is a situation in which the autonomous driving vehicle 2 should request the remote instruction device 1 to send a remote instruction. A remote instruction point situation may be set in advance by including situation elements that can be predicted from the map information and the like or may be set at any time by including situation elements that cannot be predicted only from the map information and the like. A situation element refers to an individual situation that makes up a remote instruction point situation (scene). That is, a remote instruction point situation is composed of one or more situation elements.

As situation elements that can be predicted from the map information and the like, a remote instruction point situation includes at least one of the following situation elements: a situation in which the autonomous driving vehicle 2 turns right at an intersection, a situation in which the autonomous driving vehicle 2 enters an intersection with or without a traffic light, a situation in which the autonomous driving vehicle 2 passes through a traffic light (for example, the autonomous driving vehicle 2 passes through a traffic light installed at a pedestrian crossing on the road), a situation in which the autonomous driving vehicle 2 starts to change lanes, a situation in which the autonomous driving vehicle 2 enters a construction section, a situation in which the autonomous driving vehicle 2 enters a railroad crossing, a situation in which the autonomous driving vehicle 2 stops at an autonomous driving bus stop, and a situation in which a dispatched autonomous driving vehicle stops at a boarding point or the destination. On the other hand, as situation elements that cannot be predicted only from map information and the like, a remote instruction point situation may include the following: a situation in which there is another vehicle in the lane to which the autonomous driving vehicle 2 is going to change lanes, a situation in which there is a need to determine whether to perform offset avoidance for an obstacle ahead, a situation in which there is a need to determine whether to pass the preceding vehicle, a situation in which there is a need to determine whether to pass the preceding vehicle while considering an oncoming vehicle that is coming from the opposite direction of the autonomous driving vehicle 2 and is traveling in the lane in which the autonomous driving vehicle 2 will temporarily travel when passing the preceding vehicle, and other situations in which there is a need to determine whether to perform emergency evacuation. A remote instruction point situation may include a plurality of situation elements. A remote instruction point situation may include, not only situation elements that can be predicted from the map information and the like but also situation elements that cannot be predicted only from the map information. For a country or a region where a vehicle travels on the right, a situation in which the autonomous driving vehicle 2 turns right at an intersection may be a situation in which the autonomous driving vehicle 2 turns left at an intersection. The number of other vehicles functions as situation elements that cannot be predicted only from the map information and the like and the number of other vehicles may be one or more.

The remote instruction request determination unit 34 determines that a remote instruction should be requested, for example, when the autonomous driving vehicle 2 has entered a situation in which the autonomous driving vehicle 2 enters an intersection or turns right at an intersection. The remote instruction request determination unit 34 may determine that a remote instruction should be requested when the autonomous driving vehicle 2 has entered a situation in which the autonomous driving vehicle 2 starts changing lanes to reach the destination. The remote instruction request determination unit 34 may determine that a remote instruction should be requested when an obstacle for which offset avoidance must be performed is in front of the autonomous driving vehicle 2.

The remote instruction request determination unit 34 can recognize that the autonomous driving vehicle 2 has entered a situation in which the autonomous driving vehicle 2 turns right at an intersection, that the vehicle has entered a situation in which the autonomous driving vehicle 2 enters an intersection with a traffic light, or that the autonomous driving vehicle 2 has entered a situation in which the autonomous driving vehicle 2 starts changing lanes, for example, based on the position information and the map information on the target route of the autonomous driving vehicle 2.

When the remote instruction request determination unit 34 determines that a remote instruction should be requested, the remote instruction request determination unit 34 requests the remote instruction server 10 to send a remote instruction entered by a remote commander CM. A remote instruction request includes, for example, the identification information on the autonomous driving vehicle 2. The remote instruction request determination unit 34 may request a remote instruction in advance with sufficient time. When the distance between the intersection corresponding to a remote instruction and the autonomous driving vehicle 2 becomes equal to or less than a certain distance, the remote instruction request determination unit 34 may determine that the remote instruction should be requested. In this case, instead of the distance, the time to the arrival may also be used.

The information sending unit 35 sends the autonomous driving information, which is the information relating to the autonomous driving of the autonomous driving vehicle 2, to the remote instruction device 1 via the communication unit 25. The autonomous driving information includes the position information on the autonomous driving vehicle 2 and the target route of the autonomous driving vehicle 2. The target route is a route along which the autonomous driving vehicle 2 travels in autonomous driving mode. The generation of a target route will be described later.

The autonomous driving information may include a vehicle speed plan for the target route of the autonomous driving vehicle 2. A vehicle speed plan is the vehicle speed data (vehicle speed profile) used for controlling the vehicle speed of the autonomous driving vehicle 2 in autonomous driving. The autonomous driving information may include the external environment of the autonomous driving vehicle 2 recognized by the external environment recognition unit 32 and/or the traveling state of the autonomous driving vehicle 2 recognized by the traveling state recognition unit 33.

The information sending unit 35 may send the autonomous driving information to the remote instruction device 1, for example, when the autonomous driving vehicle 2 starts autonomous driving. The information sending unit 35 may send the autonomous driving information at a preset time during autonomous driving. The preset time is not particularly limited and may be any time. The information sending unit 35 may send the information at regular intervals or may send the information each time the autonomous driving vehicle 2 travels a fixed distance. Once the information on a target route is sent, the information sending unit 35 need not resend the information on the target route until the target route is changed.

When the remote instruction request determination unit 34 determines that a remote instruction should be requested, the information sending unit 35 sends the traveling situation information on the autonomous driving vehicle 2 to the remote instruction server 10. The traveling situation information on the autonomous driving vehicle 2 includes the information for the remote commander CM to recognize the situation of the autonomous driving vehicle 2. The traveling situation information may be more detailed than the autonomous driving information.

More specifically, the traveling situation information on the autonomous driving vehicle 2 includes at least one of the detection information detected by the in-vehicle sensor of the autonomous driving vehicle 2 and the information generated from the detection information detected by the in-vehicle sensor (for example, the overhead view image of the autonomous driving vehicle 2). The detection information detected by the in-vehicle sensor may include, for example, the image of the road in front of the autonomous driving vehicle 2 captured by the camera of the autonomous driving vehicle 2. The detection information detected by the in-vehicle sensor may include the captured image around the autonomous driving vehicle 2 including the image to the sides of, and behind, the autonomous driving vehicle 2. Furthermore, the detection information detected by the in-vehicle sensor may include the object information detected by the radar sensor of the external sensor 22. The detection information detected by the in-vehicle sensor may include the identification result of the type of an object. As the detection information detected by the in-vehicle sensor, the information sending unit 35 may use the information on the external environment of the autonomous driving vehicle 2 recognized by the external environment recognition unit 32.

The detection information detected by the in-vehicle sensor may include the vehicle speed information on the autonomous driving vehicle 2 detected by the vehicle speed sensor of the internal sensor 23. The detection information detected by the in-vehicle sensor may include the yaw rate information on the autonomous driving vehicle 2 detected by the yaw rate sensor of the internal sensor 23. The detection information detected by the in-vehicle sensor may include the steering angle information on the autonomous driving vehicle 2. As the detection information detected by the in-vehicle sensor, the information sending unit 35 may use the traveling state information on the autonomous driving vehicle 2 recognized by the traveling state recognition unit 33.

Furthermore, the traveling situation information on the autonomous driving vehicle 2 may include the position information on the autonomous driving vehicle 2. The traveling situation information on the autonomous driving vehicle 2 may also include the information on the occupants (occupant presence/absence, number of occupants). The traveling situation information on the autonomous driving vehicle 2 may also include the information on the trajectory according to a remote instruction selectable by a remote commander CM. A trajectory will be described later.

The trajectory generation unit 36 generates a trajectory to be used for the autonomous driving of the autonomous driving vehicle 2. The trajectory generation unit 36 generates the trajectory of autonomous driving based on a preset target route, the map information, the position information on the autonomous driving vehicle 2, the external environment of the autonomous driving vehicle 2, and the traveling state of the autonomous driving vehicle 2. A trajectory is equivalent to the traveling plan of autonomous driving.

A trajectory includes a path along which the vehicle is to autonomously travel and a vehicle speed plan used in autonomous driving. A path is the locus along which the vehicle that is autonomously traveling is to travel on the target route. A path can be the steering-angle change data (steering angle plan) on the autonomous driving vehicle 2, for example, according to a position on the target route. A position on the target route is, for example, a set longitudinal position that is set at predetermined intervals (for example, 1 m) in the traveling direction of the target route. A steering angle profile is data in which a target steering angle is associated with each set longitudinal position.

A target route is set based, for example, on the destination, the map information, and the position information on the autonomous driving vehicle 2. A target route may also be set considering the traffic information such as traffic congestion. A target route may also be set by a known navigation system. A destination may be set by an occupant of the autonomous driving vehicle 2 or may be automatically proposed by the autonomous driving ECU 20 or by the navigation system.

The trajectory generation unit 36 generates a path along which the autonomous driving vehicle 2 is to travel based, for example, on the target route, the map information, the external environment of the autonomous driving vehicle 2, and the traveling state of the autonomous driving vehicle 2. The trajectory generation unit 36 generates a path, for example, in such a way that the autonomous driving vehicle 2 will pass through the center (the center in the lane width direction) of the lane included in the target route.

A vehicle speed plan is data in which the target vehicle speed is associated with each set longitudinal position. A set longitudinal position may be set based on the traveling time of the autonomous driving vehicle 2 instead of the distance. A set longitudinal position may be set, for example, as the arrival position of the vehicle in one second or the arrival position of the vehicle in two seconds. In this case, the vehicle speed plan can also be represented as the data according to the traveling time.

The trajectory generation unit 36 may generate a vehicle speed plan, for example, based on the path and the traffic regulation information such as the legal speed limits included in the map information. Instead of the legal speed limits, the speed that is preset for a position or a section on the map may also be used. When the autonomous driving vehicle 2 is an autonomous driving bus, the trajectory generation unit 36 may generate a vehicle speed plan considering the stop time at each stop, based on the operation plan that includes the arrival time determined for each stop. The trajectory generation unit 36 generates the trajectory of autonomous driving from the path and the vehicle speed plan. Note that the method of generating a trajectory by the trajectory generation unit 36 is not limited to the method described above but a known method for autonomous driving may also be used. The same applies to the contents of a trajectory.

The trajectory generation unit 36 generates, in advance, a trajectory corresponding to a remote instruction when the remote instruction request determination unit 34 requests the remote instruction server 10 to send a remote instruction or when the autonomous driving vehicle 2 approaches an intersection or the like corresponding to a remote instruction. The content of a remote instruction is predetermined according to the situation of the autonomous driving vehicle 2. For example, the content of a remote instruction at the time of turning right at an intersection includes a remote instruction to "proceed (start turning right)" and a remote instruction to "stop (suspend determination)". The content of a remote instruction at the time of turning right at an intersection may include a remote instruction to go straight without turning right (a remote instruction to change route) or a remote instruction to perform emergency evacuation.

For example, when the autonomous driving vehicle 2 is in a situation to turn right at an intersection, the trajectory generation unit 36 generates a trajectory for the autonomous driving vehicle 2 to turn right at the intersection so as to correspond to a remote instruction to start turning right. Before a remote instruction is received, the trajectory generation unit 36 may update the trajectory according to a change in the external environment. In addition, when a remote instruction to switch from turning right at an intersection to going straight at the intersection is available for use, the trajectory generation unit 36 may generate, in advance, a trajectory for going straight through the intersection.

When a remote instruction for emergency evacuation is available for use, the trajectory generation unit 36 may generate a trajectory for emergency evacuation in advance. A trajectory for emergency evacuation is generated so as to stop the autonomous driving vehicle 2 in one of the evacuation spaces that are set in advance on the map. The trajectory generation unit 36 recognizes the presence or absence of an obstacle in each evacuation space, for example, based on the external environment and generates an emergency evacuation trajectory so as to stop the autonomous driving vehicle 2 in an empty evacuation space. The trajectory generation unit 36 does not necessarily need to generate a trajectory in advance, but may generate a trajectory corresponding to a remote instruction after receiving the remote instruction.

The autonomous driving control unit 37 performs the autonomous driving of the autonomous driving vehicle 2. The autonomous driving control unit 37 performs the autonomous driving of the autonomous driving vehicle 2, for example, based on the external environment of the autonomous driving vehicle 2, the traveling state of the autonomous driving vehicle 2, and the trajectory generated by the trajectory generation unit 36. The autonomous driving control unit 37 sends the control signal to the actuator 26 to perform autonomous driving of the autonomous driving vehicle 2.

When the remote instruction request determination unit 34 requests the remote instruction server 10 to send a remote instruction, the autonomous driving control unit 37 waits for the remote instruction to be sent from the remote instruction server 10. When the autonomous driving control unit 37 requests a remote instruction after the autonomous driving vehicle 2 stops, the autonomous driving control unit 37 keeps the autonomous driving vehicle 2 in the stopped state until the remote instruction is received.

When a driver with a driver's license is in the vehicle and when a remote instruction is not received even after a preset standby time has elapsed, the autonomous driving control unit 37 may request the occupant to make a determination or to perform manual driving. When a remote instruction is not received even after the standby time has elapsed and when an occupant cannot make a determination or perform manual driving (for example, when no occupant is in the vehicle), the autonomous driving control unit 37 may perform emergency evacuation automatically.

When a remote instruction for an occupant to get in or out of the autonomous driving vehicle 2 is received, the autonomous driving control unit 37 may automatically open or close the door of the autonomous driving vehicle 2 or may start voice guidance for getting out of the vehicle.

Configuration of Remote Instruction Device

Figure 4:
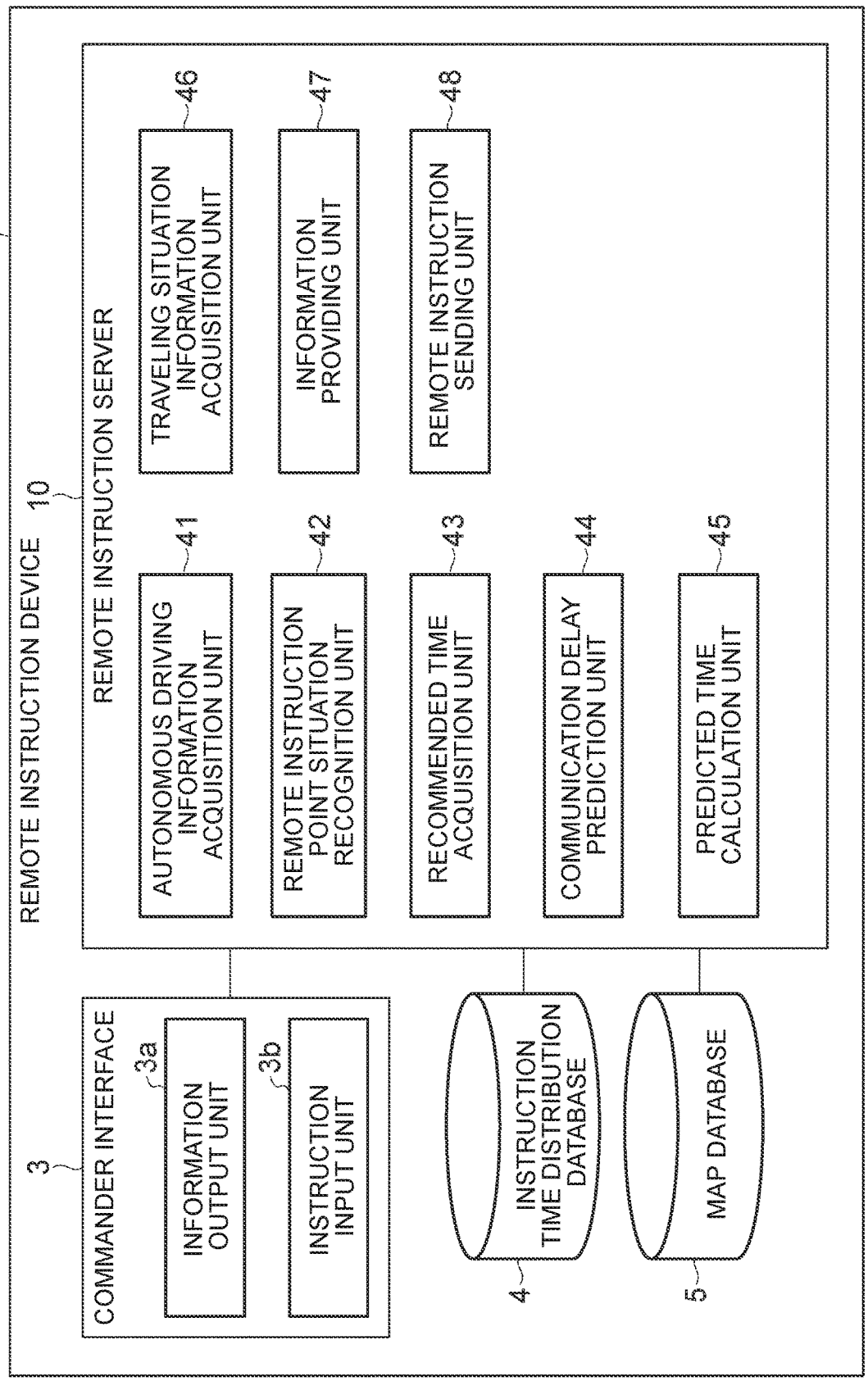
FIG. 4 is a block diagram showing an example of a configuration of a remote instruction device.

A configuration of the remote instruction device 1 in this embodiment will be described below with reference to the drawings. As shown in FIG. 4, the remote instruction device 1 includes a remote instruction server 10, a commander interface 3, an instruction time distribution database 4, and a map database 5.

Figure 3:
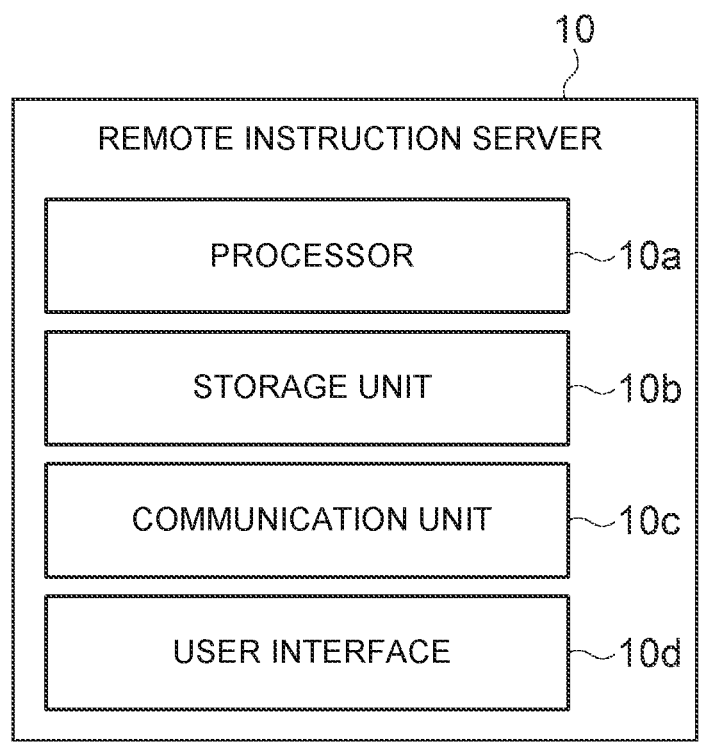
FIG. 3 is a block diagram showing an example of a hardware configuration of a remote instruction server.

First, a hardware configuration of the remote instruction server 10 will be described. FIG. 3 is a block diagram showing an example of a hardware configuration of the remote instruction server 10. As shown in FIG. 3, the remote instruction server 10 is configured as a general computer including a processor 10a, a storage unit 10b, a communication unit 10c, and a user interface 10d. A user in this case means a user of the remote instruction server 10 (administrator or the like).

The processor 10a operates the various operating systems to control the remote instruction server 10. The processor 10a is an arithmetic unit such as a CPU including a control device, an arithmetic device, registers, and the like. The processor 10a integrally controls the storage unit 10b, communication unit 10c, and user interface 10d. The storage unit 10b includes at least one of a memory and a storage. The memory is a storage medium such as a ROM and a RAM. The storage is a storage medium such as an HDD.

The communication unit 10c is a communication apparatus for performing communication via the network N. For the communication unit 10c, a network device, a network controller, a network card, or the like may be used. The user interface 10d is an input/output unit of the remote instruction server 10 for use by a user such as an administrator. The user interface 10d includes an output apparatus, such as a display and a speaker, and an input apparatus such as a touch panel. Note that the remote instruction server 10 does not necessarily need to be provided in a facility but may be mounted on a moving object such as a vehicle.

FIG. 4 is a block diagram showing an example of a configuration of the remote instruction device 1. As shown in FIG. 4, the commander interface 3 is an input/output unit of the remote instruction device 1 for use by a remote commander CM. The commander interface 3 includes an information output unit 3a and an instruction input unit 3b.

The information output unit 3a is an apparatus that outputs to a remote commander CM the information that is used for sending a remote instruction to the autonomous driving vehicle 2. The information output unit 3a includes a display that outputs an image and a speaker that outputs sound.

For example, the image in front of the autonomous driving vehicle 2 (the image of the scene ahead), captured by the camera of the autonomous driving vehicle 2, is displayed on the display. The display may have a plurality of display screens on which the images to the sides of, and/or behind, the autonomous driving vehicle 2 may be displayed. The display is not particularly limited as long as the display is configured to be able to provide visual information to a remote commander CM. The display may be a wearable device mounted so as to cover the eyes of a remote commander CM.

The speaker is, for example, a headset speaker mounted on the head of a remote commander CM. For example, the speaker sends the situation of the autonomous driving vehicle 2 (for example, the situation in which the autonomous driving vehicle 2 turns right at an intersection) to a remote commander CM by voice. The speaker need not necessarily be a headset but may be a stationary type speaker.

The information output unit 3a may provide information to a remote commander CM by vibration. For example, the information output unit 3a may include a vibration actuator provided on the seat of a remote commander CM. The information output unit 3a may alert a remote commander CM by vibration to notify that another vehicle is approaching the autonomous driving vehicle 2. The information output unit 3a may have a vibration actuator on each of the right side and left side of the seat so that the vibration actuator on the side corresponding, for example, to the approaching direction of another vehicle is vibrated. The information output unit 3a may have wearable vibration actuators that are mounted on the body of a remote commander CM. In this case, the information output unit 3a can provide information to a remote commander CM by vibrating the vibration actuator mounted at the position of the body corresponding, for example, to the approaching direction of another vehicle.

The instruction input unit 3b is an apparatus from which a remote commander CM enters a remote instruction corresponding to the situation of the autonomous driving vehicle 2. The instruction input unit 3b is configured in such a way that instructions such as "proceed", "stop", "suspend determination", "change lane", "pass", "cancel" and the like can be entered. The instruction input unit 3b may employ, for example, a gate-type lever structure. In addition, the instruction input unit 3b may employ various input methods. The instruction input unit 3b may employ buttons and a touch panel or may employ various switches such as a toggle switch and a rocker switch. The instruction input unit 3b may employ a keyboard or a voice input device.

The instruction time distribution database 4 is a database that stores the information on instruction time distributions. An instruction time is a time at which a remote instruction is entered, generated, or sent from the remote instruction device 1. More specifically, an instruction time is, for example, a time at which a remote instruction is entered into the instruction input unit 3b by a remote commander CM.

An instruction time may also be a time at which a remote instruction is sent to the autonomous driving vehicle 2 by the remote instruction sending unit 48. An instruction time may also be a time at which a remote instruction is automatically generated when a remote instruction is automatically generated instead of being entered by a remote commander CM. The "time" in this case may be a "time of day" in a certain period of time in a certain situation, may be one of a series of longitudinal positions along the traveling direction of the autonomous driving vehicle 2, or may be a value within a certain range of Time To Collision (TTC) with respect to an external environment such as another vehicle. When the "time" is represented by one of a series of longitudinal positions along the traveling direction of the autonomous driving vehicle 2, a "time earlier than the recommended time" may mean a "longitudinal position behind the longitudinal position corresponding to the recommended time in the traveling direction of the autonomous driving vehicle 2"; similarly, a "time later than the recommended time" may mean a "longitudinal position ahead of the longitudinal position corresponding to the recommended time in the traveling direction of the autonomous driving vehicle 2". When the "time" is represented by a value within a certain range of TTC, a "time earlier than the recommended time" may mean a "TTC larger than the TTC corresponding to the recommended time in a situation in which the TTC becomes small" or a "TTC smaller than the TTC corresponding to the recommended time in a situation in which the TTC becomes large"; similarly, a "time later than the recommended time" may mean a "TTC smaller than the TTC corresponding to the recommended time in a situation in which the TTC becomes small" or a "TTC larger than the TTC corresponding to the recommended time in a situation in which the TTC becomes large".

An instruction time distribution is a distribution indicating to the degree of variation in the instruction times at which remote commanders CM send an instruction to an assumed remote instruction point situation. The instruction times of remote commanders CM usually vary in a range of time or distance from the start to the end of a remote instruction point situation. The instruction time distribution can be acquired in advance, for example, by collecting statistics of the instruction times of remote instructions while reproducing a target remote instruction point situation through experiment or simulation in which a plurality of remote commanders CM participate as subjects. This means that, when the vehicle remote instruction system 100 is in practical use, the instruction time distribution database 4 does not need to store, in real time, the instruction times when a remote instruction is entered by a remote commander CM. The instruction time distribution database 4 stores at least the remote instruction time distributions acquired before the vehicle remote instruction system 100 is put in practical use.

The instruction time distribution database 4 may store a plurality of instruction time distributions according to a remote instruction point situation, the type of a remote instruction sent to the autonomous driving vehicle 2 in the remote instruction point situation, and the traveling situation and/or external environment of the autonomous driving vehicle 2 in the remote instruction point situation.

More specifically, the instruction time distribution database 4 may store a plurality of instruction time distribution components as the information related to an instruction time distribution. Instruction time distribution components mean instruction time distributions, one for each of the plurality of situation elements, when a plurality of situation elements is included in a remote instruction point situation. When only one situation element is included in one remote instruction point situation, the instruction time component matches the instruction time distribution component corresponding to the situation element.

Figure 5:
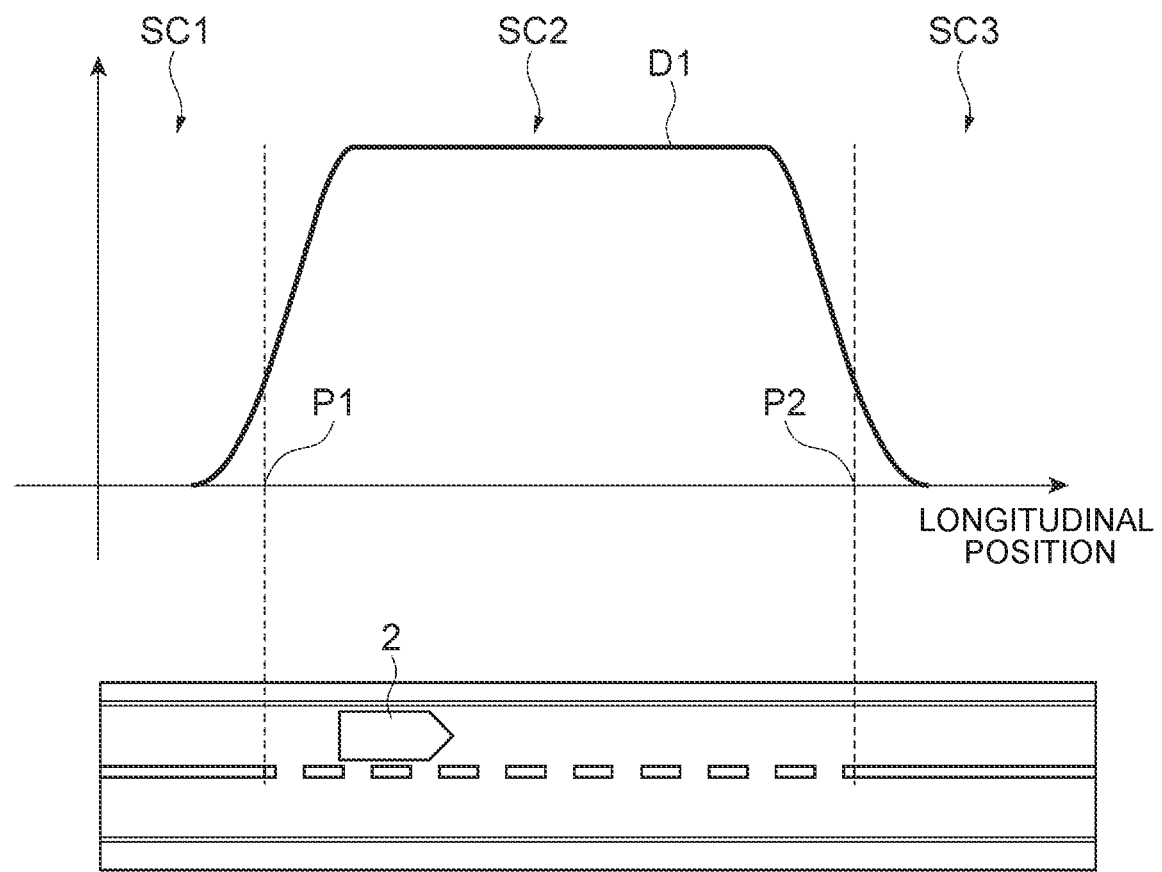
FIG. 5 is a diagram showing an example of an instruction time distribution.

FIG. 5 is a diagram showing an example of an instruction time distribution. FIG. 5 shows a remote instruction point situation on a four-lane road (two lanes each way) where a lane change is legally allowed in a section of the road. In this remote instruction point situation, the autonomous driving vehicle 2 is traveling in the left lane and it is necessary for the autonomous driving vehicle 2 to change lanes from the left lane to the right lane in order to reach the destination along the target route. FIG. 5 shows an example of an instruction time distribution in this remote instruction point situation when the type of the remote instruction is that the autonomous driving vehicle 2 changes lanes to the right lane.

The horizontal axis in FIG. 5 indicates the longitudinal position along the traveling direction of the target route of the autonomous driving vehicle 2. The vertical axis in FIG. 5 indicates the instruction time distribution index at each longitudinal position. The instruction time distribution index may be, for example, an index obtained by normalizing the frequency of instruction times using a predetermined method. The instruction time distribution index may be the frequency of instruction times itself. The horizontal axis may be the distance to reach position P2 or may be the remaining time to reach position P2 at the current vehicle speed. In this case, a distance or a remaining time beyond position P2 may be expressed as a negative value. The instruction time distributions, though represented by a continuous line in FIG. 5 to FIG. 14, may be represented by discrete points.

On the road shown in FIG. 5, it is legally allowed to change lanes in section SC2 from position P1 to position P2. On this road, a lane change is legally prohibited in section SC1 behind position P1 in the traveling direction (left side in the figure) and in section SC3 ahead of position P2 in the traveling direction (right side in the figure). In this case, it is desirable that the autonomous driving vehicle 2 behave to change lanes in section SC2 in response to the remote instruction. However, due to personal differences among remote commanders CM, a communication delay of the remote instruction (described later), and the like, the instruction times of the plurality of remote commanders CM are not necessarily distributed uniformly in section SC2.

In instruction time distribution D1, the distribution index value is maximum in a part of the section including the center of section SC2 in the traveling direction. That the distribution index value is maximum indicates that many participating remote commanders CM recognize that it is appropriate for the autonomous driving vehicle 2 to behave to change lanes in section SC2. On the other hand, in instruction time distribution D1, the distribution index value decreases as the longitudinal position approaches from section SC2 to section SC1 or to section SC3. Such a decreasing tendency of the distribution index value indicates that many participating remote commanders CM recognize that it is not an appropriate time (or there is a feeling of discomfort) for the autonomous driving vehicle 2 to behave to change lanes in section SC2.

In summary, the instruction time distribution database 4 can be thought of as follows. (1) The instruction time distribution database 4 stores the information on whether the behavior of the autonomous driving vehicle 2 that has received a remote instruction for a certain situation element is appropriate (ideal behavior of the autonomous driving vehicle 2) or whether the behavior of the autonomous driving vehicle 2 that has received a remote instruction for a certain situation element is inappropriate (or there is a feeling of discomfort). (2) The instruction time distribution database 4 stores this information in the form of instruction time distribution components that have been acquired based on the determinations made by the participating remote commanders CM.

Figure 6:
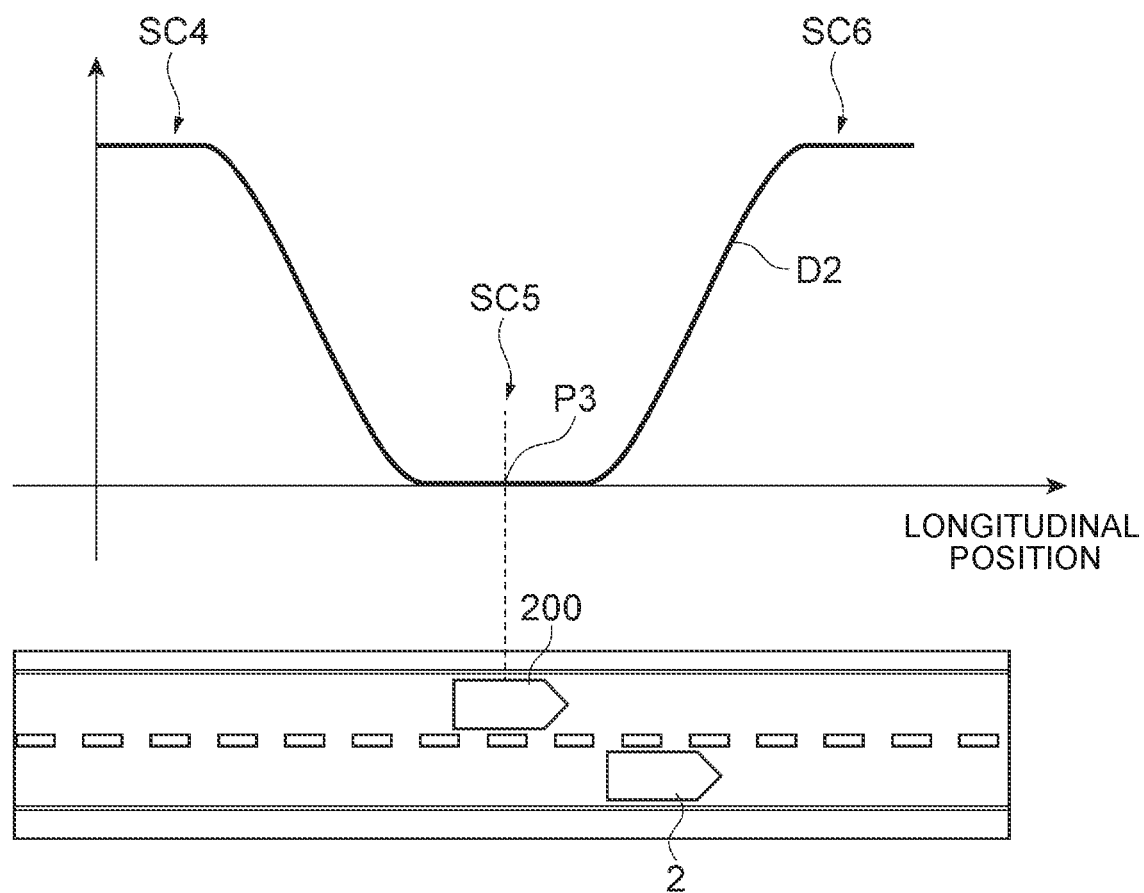
FIG. 6 is a diagram showing an example of an instruction time distribution.

Next, FIG. 6 is a diagram showing an example of an instruction time distribution. FIG. 6 shows a remote instruction point situation on a four-lane road where a lane change is legally allowed in each lane. In this remote instruction point situation, the autonomous driving vehicle 2 is traveling in the right lane, another vehicle 200 is traveling diagonally behind the autonomous driving vehicle 2 in the left lane, and it is necessary for the autonomous driving vehicle 2 to change lanes from the right lane to the left lane in order to reach the destination along the target route. FIG. 6 shows an example of an instruction time distribution when the type of the remote instruction is that the autonomous driving vehicle 2 changes to the left lane in this remote instruction point situation.

The horizontal axis in FIG. 6 indicates the longitudinal position along the traveling direction of the target route of the autonomous driving vehicle 2. The vertical axis in FIG. 6 indicates the instruction time distribution index at each longitudinal position. The horizontal axis may indicate a distance with position P3 as the reference point. The horizontal axis may be the TTC of the autonomous driving vehicle 2 in relation to the other vehicle 200. The variations of the unit of the horizontal axis may also be used for the horizontal axis when "longitudinal position" is shown on the horizontal axis in FIG. 7 and the subsequent figures.

In the situation shown in FIG. 6, the autonomous driving vehicle 2 may change lanes ahead of or behind the other vehicle 200. In this case, it is desirable that the autonomous driving vehicle 2 behave to change lanes in response to a remote instruction while securing a sufficient distance or TTC to the other vehicle 200.

In instruction time distribution D2, the distribution index value is minimum in a certain section including the center of section SC5. That the distribution index value is minimum in this way indicates that many participating remote commanders CM recognize that it is inappropriate for the autonomous driving vehicle 2 to behave to change lanes in section SC5 (or there is a feeling of discomfort). In instruction time distribution D2, the distribution index value increases as the longitudinal position approaches from section SC5 to section SC4 or to section SC6. Such an increasing tendency of the distribution index value indicates an increase in the number of participating remote commanders CM who recognize that the distance of the autonomous driving vehicle 2 to the other vehicle 200 is a distance appropriate for starting a lane change (or that a feeling of discomfort is small). In instruction time distribution D2, the distribution index value is maximum in a section that is in section SC4 or section SC6 and that is sufficiently distant from position P3.

Figure 7:
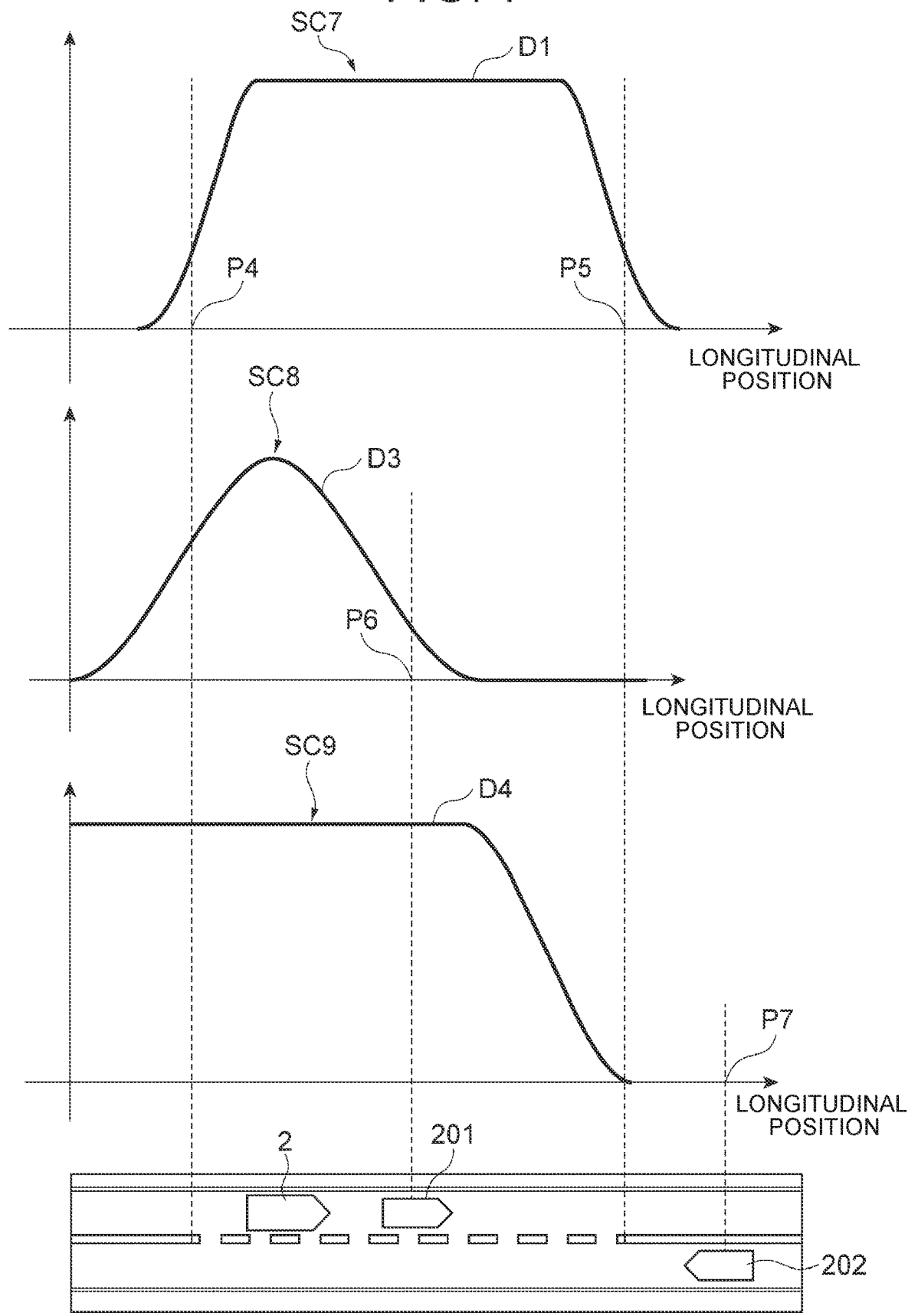
FIG. 7 is a diagram showing an example of instruction time distribution components.

FIG. 7 is a diagram showing an example of instruction time distribution components. FIG. 7 shows a remote instruction point situation on a two-lane road where passing is legally allowed in some sections. In this remote instruction point situation, the autonomous driving vehicle 2 is traveling behind the other vehicle 201 that is traveling at a lower speed than the autonomous driving vehicle 2, another vehicle 202 is traveling in the oncoming lane, and the autonomous driving vehicle 2 is going to pass the other vehicle 201 in the section if possible. On the road shown in FIG. 7, passing is legally allowed in section SC7 from position P4 to position P5. On this road, passing is prohibited in a section behind position P4 in the traveling direction (left side in the figure) and in a section ahead of position P5 in the traveling direction (right side in the figure). As an example of such a remote instruction point situation, FIG. 7 shows instruction time distribution components when the type of the remote instruction is passing.

In the example in FIG. 7, the following three distribution components are shown as the instruction time distribution components in the order from top: a first instruction time distribution component for allowing the autonomous driving vehicle 2 to behave to pass in section SC7, a second instruction time distribution component for passing the other vehicle 201, and a third instruction time distribution component for passing in consideration of the other vehicle 202. The horizontal axis in FIG. 7 indicates the longitudinal position along the traveling direction of the target route of the autonomous driving vehicle 2, and the vertical axis in FIG. 7 indicates the instruction time distribution index at each longitudinal position.

In the first instruction time distribution component, the situation in which "the autonomous driving vehicle 2 passes in section SC7" is similar to the situation in which "the autonomous driving vehicle 2 changes lanes in section SC2 from position P1 to position P2" in FIG. 5. Therefore, the first instruction time distribution component in FIG. 7 may be the same as instruction time distribution D1 in FIG. 5.

Second instruction time distribution component D3 corresponds to the instruction time distribution of instruction times at which the autonomous driving vehicle 2 starts passing the other vehicle 201 that is the preceding vehicle. The horizontal axis of second instruction time distribution component D3 indicates, for example, the longitudinal position with the position of the other vehicle 201 as the reference point. In second instruction time distribution component D3, the distribution index value is maximum at the center of section SC8. That the distribution index value is maximum in this way indicates that many participating remote commanders CM recognize that position of the autonomous driving vehicle 2 with respect to position P6 of the other vehicle 201 is appropriate for starting passing (or that the feeling of discomfort is small). In second instruction time distribution component D3, the distribution index value decreases as the position becomes distant from the center of section SC8. Such a decreasing tendency of the distribution index value indicates an increase in the number of participating remote commanders CM who recognize that it is inappropriate (or there is a feeling of discomfort) for the autonomous driving vehicle 2 to start passing.

Third instruction time distribution component D4 corresponds to the instruction time distribution of the instruction times at which a remote instruction is sent to the autonomous driving vehicle 2 for starting passing the other vehicle 201 in consideration of the other vehicle 202 that is an oncoming vehicle. The horizontal axis of third instruction time distribution component D4 is, for example, the longitudinal position with position P7 of the other vehicle 202 as the reference point. In third instruction time distribution component D4, the distribution index value decreases as the position becomes near to position P7 of the other vehicle 202. Such a decreasing tendency of the distribution index value indicates an increase in the number of participating remote commanders CM who recognize that it is inappropriate for the autonomous driving vehicle 2 to start passing (or there is a feeling of discomfort) in consideration of the other vehicle 202. In third instruction time distribution component D4, the distribution index value increases as the position becomes distant from position P7, and the distribution index value is maximum in section SC9 that is at least a certain distance from position P7. Such an increasing tendency, or the maximum, of the distribution index value indicates an increase in the number of participating remote commanders CM who recognize that it is a distance appropriate for starting passing (or a little uncomfortable) even in consideration of the other vehicle 202.

In the remote instruction point situation shown in FIG. 7, it is desirable that, in response to a remote instruction, the autonomous driving vehicle 2 behave to temporarily travel in the oncoming lane to pass the other vehicle 201 in consideration of the presence of the other vehicle 202 in the oncoming lane. When there is a plurality of instruction time distribution components as shown in FIG. 7, an instruction time distribution corresponding to the remote instruction point situation shown in FIG. 7 can be obtained by combining the plurality of instruction time distribution components (details will be described later).

For an area in which statistical data on participating remote commanders CM is not sufficiently collected, the instruction time distribution database 4 may use a database in which the situations of car accidents are accumulated. By referring to the inappropriate driving operation times corresponding to the area, it is possible to estimate whether the instruction time is appropriate as the instruction time of a remote instruction.

The map database 5 is a database that stores map information. The map information includes the position information on roads, the information on road shapes (for example, information on road curvatures), the position information on intersections and branch points, the position information on traffic lights, and the like. The map information may include traffic regulation information such as the legal speed limits associated with the position information and whether a lane change is possible. The map information may also include the area information such as the information on a city area and a suburban area. The map information may also include the position information on base stations for communication. The map database 5 may be built in a server that can communicate with the remote instruction server 10.

Next, a functional configuration of the remote instruction server 10 will be described. As shown in FIG. 4, the remote instruction server 10 includes an autonomous driving information acquisition unit 41, a remote instruction point situation recognition unit 42, a recommended time acquisition unit 43, a communication delay prediction unit 44, a predicted time calculation unit 45, a traveling situation information acquisition unit 46, an information providing unit 47, and a remote instruction sending unit 48.

The autonomous driving information acquisition unit 41 acquires the autonomous driving information sent from the autonomous driving vehicle 2. The autonomous driving information acquisition unit 41 acquires the position information on the autonomous driving vehicle 2 and the target route of the autonomous driving vehicle 2 as the autonomous driving information. In addition to the position information on, and the target route of, the autonomous driving vehicle 2, the autonomous driving information acquisition unit 41 may acquire the vehicle speed plan and/or the path of the autonomous driving vehicle 2.

The remote instruction point situation recognition unit 42 recognizes the situation of a remote instruction point on the target route based on the position of the autonomous driving vehicle 2, the target route of the autonomous driving vehicle 2, the external environment of the autonomous driving vehicle 2, and the map information. The remote instruction point situation recognized by the remote instruction point situation recognition unit 42 includes at least one of the following two: (1) a remote instruction point situation (the situation element that can be predicted from the map information and the like) that can be recognized by the map information and the target route and (2) a remote instruction point situation (the situation element that cannot be predicted only from the map information and the like) that cannot be recognized only by the map information and the target route. The position on the map associated with the start of a remote instruction point situation may be used as the start position of the remote instruction point situation. The position on the map associated with the end of a remote instruction point situation may be used as the end position of the remote instruction point situation.

The remote instruction point situation recognition unit 42 recognizes, as a situation element, a situation in which a lane change is started, for example, from a section in which a lane change on the target route of the autonomous driving vehicle 2 is legally allowed. The start position of the situation in which the lane change is started may be the start position of the section in which the lane change is legally allowed.

The remote instruction point situation recognition unit 42 recognizes, as a situation element, a situation in which a determination by a remote instruction is required in consideration of another vehicle, for example, from an external environment where there is the other vehicle traveling around the autonomous driving vehicle 2. The start position of such a situation may be, for example, the position where the other vehicle is recognized.

The remote instruction point situation recognition unit 42 recognizes, as a situation element, a situation in which a determination whether to pass the preceding vehicle is required, for example, from an external environment in which, in a section where passing on the target route of the autonomous driving vehicle 2 is legally allowed, there is a preceding vehicle that is slower than the autonomous driving vehicle 2 in the traveling lane of the autonomous driving vehicle 2. The start position of the situation in which the determination whether to pass the preceding vehicle is required may be, for example, the position where such a preceding vehicle is recognized. In addition, the remote instruction point situation recognition unit 42 may recognize, as a situation element, a situation in which a determination whether to pass the preceding vehicle is required while considering an oncoming vehicle, for example, from an external environment in which there is the oncoming vehicle traveling in a lane ahead of the autonomous driving vehicle 2 in which the autonomous driving vehicle 2 will temporarily travel to pass the preceding vehicle.

The remote instruction point situation recognition unit 42 recognizes, as a situation element, a situation in which the autonomous driving vehicle 2 enters an intersection, for example, from the intersection on the target route of the autonomous driving vehicle 2. The start position of the situation in which the autonomous driving vehicle 2 enters the intersection may be, for example, the position of the intersection or the position of the stop line before the intersection. In addition, the remote instruction point situation recognition unit 42 recognizes, as a situation element, a situation in which the autonomous driving vehicle 2 turns right at an intersection, for example, from an intersection on the target route at which the autonomous driving vehicle 2 is to turn right. The start position of the situation in which the vehicle turns right at the intersection may be, for example, the position of the intersection.

The remote instruction point situation recognition unit 42 recognizes, as a situation element, a situation in which an autonomous driving bus stops at a stop at and, then, starts from the stop, for example, from the position of the stop of the autonomous driving bus on the target route. The start position of the situation in which the bus stops at the stop and, then, starts from the stop is, for example, the position of the stop. In addition, the remote instruction point situation recognition unit 42 recognizes, as a situation element, a situation in which the autonomous driving vehicle 2 stops to allow a user (for example, the user who has issued a dispatch request for the autonomous driving vehicle 2) to board on the autonomous driving vehicle 2 and in which the autonomous driving vehicle 2 starts from that position, for example, from the boarding position of the user on the target route. The start position of the situation in which the autonomous driving vehicle 2 stops to allow the user to board on the autonomous driving vehicle 2 and in which the autonomous driving vehicle 2 starts from that position is, for example, the boarding position. The same can be applied to a situation in which the autonomous driving vehicle 2 stops at, and then starts from, the destination.

In addition, the remote instruction point situation recognition unit 42 recognizes, as a situation element, a situation in which the autonomous driving vehicle 2 enters a construction section, for example, from the construction section on the target route. The start position of the situation in which the autonomous driving vehicle 2 enters the construction section may be, for example, the start position of the construction section. In addition, the remote instruction point situation recognition unit 42 recognizes, as a situation element, a situation in which the autonomous driving vehicle 2 enters a railroad crossing, for example, from the railroad crossing on the target route. The start position of the situation in which the autonomous driving vehicle 2 enters the railroad crossing may be, for example, the position of the railroad crossing.

When a situation element is recognized singly, the remote instruction point situation recognition unit 42 may recognize the situation element as one remote instruction point situation. When a plurality of situation elements is recognized, the remote instruction point situation recognition unit 42 may recognize them as one remote instruction point situation including the plurality of situation elements.

The recommended time acquisition unit 43 acquires a recommended time that is set in advance with a predetermined time in the range, from the start to the end of a remote instruction point situation, as the reference point based on the remote instruction point situation and the type of a remote instruction. The recommended time is a time at which the remote instruction is reflected on the autonomous driving vehicle 2 and is a time that suits the external environment of the autonomous driving vehicle 2. For example, the recommended time is an ideal time at which the autonomous driving vehicle 2, controlled by the remote instruction, performs a predetermined behavior. The predetermined behavior is represented, for example, by at least one of a predetermined value of the vehicle speed, a predetermined value of the longitudinal acceleration, a predetermined value of the steering angle, and a predetermined value of the yaw rate. Each of the predetermined values may be set in advance according to the remote instruction point situation and the type of the remote instruction.

The reference point of the recommended time is a time freely set for each remote instruction point situation in the range from the start to the end of the remote instruction point situation. The reference point of a recommended time may be the same as the reference point of an instruction time distribution; for example, the reference point of a recommended time may be the reference point on the horizontal axis (the longitudinal position) of an instruction time distribution shown, for example, in FIG. 5 (for example, in FIG. 5, position P1 that is the start of section SC2). As the reference point of a recommended time, the start position of a remote instruction point situation (the start time of the remote instruction point situation) may be used, the end position of a remote instruction point situation (the end time of the remote instruction point situation) may be used or, when there is an object such as another vehicle in the external environment, the time at which the autonomous driving vehicle 2 reaches the position of the other vehicle may be used.

The recommended time acquisition unit 43 acquires an instruction time distribution from which the recommended time is to be acquired, based on the remote instruction point situation and the type of the remote instruction. More specifically, when a remote commander CM performs an input operation on the instruction input unit 3b of the commander interface 3, the recommended time acquisition unit 43 determines whether a remote instruction has been entered by the remote commander CM. When the recommended time acquisition unit 43 determines that a remote instruction has been entered by the remote commander CM, the recommended time acquisition unit 43 recognizes the type of the entered remote instruction. The type of the remote instruction recognized by the recommended time acquisition unit 43 at this time is the type of a remote instruction that is used at the remote instruction point situation recognized by the remote instruction point situation recognition unit 42.

The recommended time acquisition unit 43 acquires the instruction time distribution corresponding to the remote instruction point situation, recognized by the remote instruction point situation recognition unit 42, and the type of the remote instruction, recognized as described above, from the instruction time distribution database 4. When the remote instruction point situation is composed of a plurality of situation elements, the recommended time acquisition unit 43 may acquire a plurality of instruction time distribution components, corresponding to the plurality of situation elements, from the instruction time distribution database 4. In this case, the recommended time acquisition unit 43 may combine the plurality of acquired instruction time distribution components for acquiring one instruction time distribution as described below.

Figure 8:
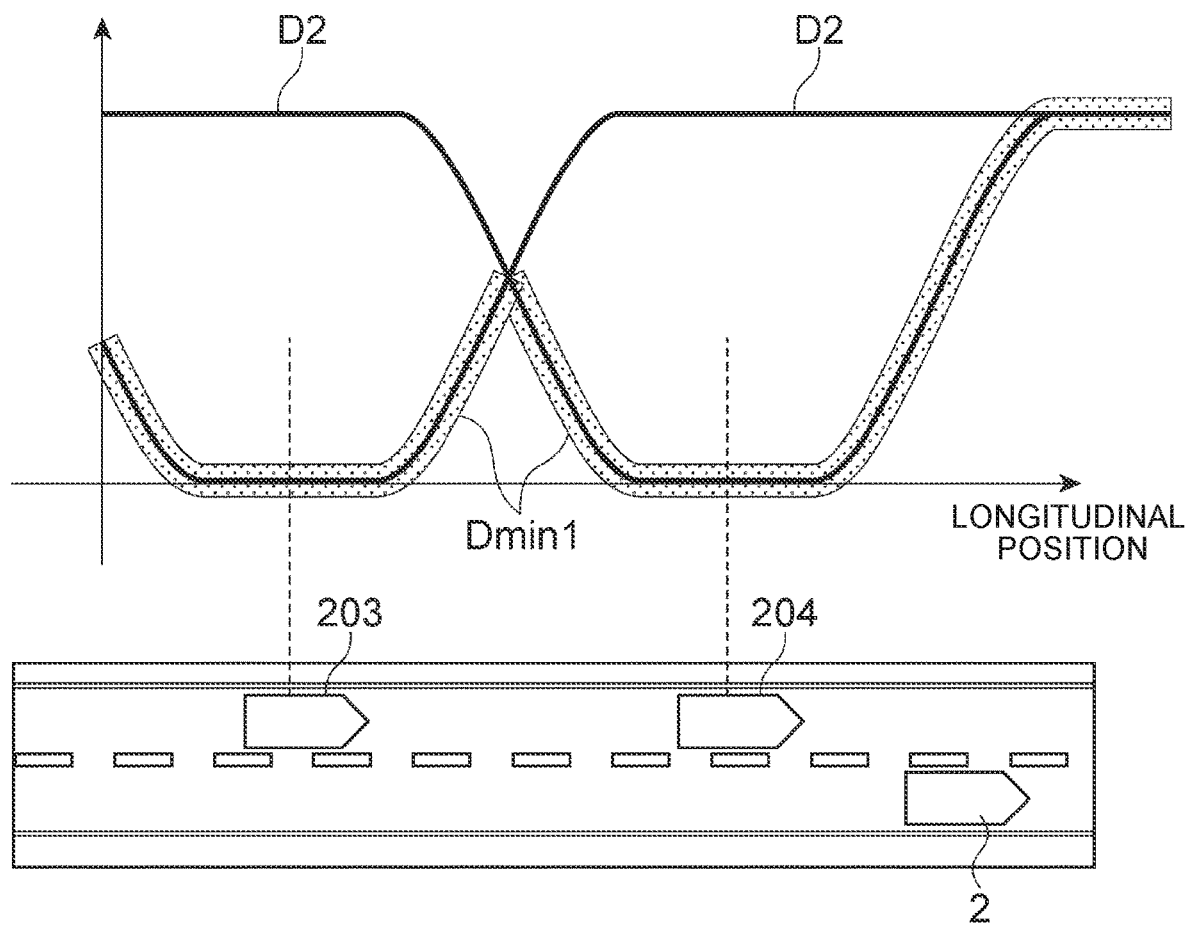
FIG. 8 is a diagram showing an example of combining instruction time distribution components.
Figure 9:
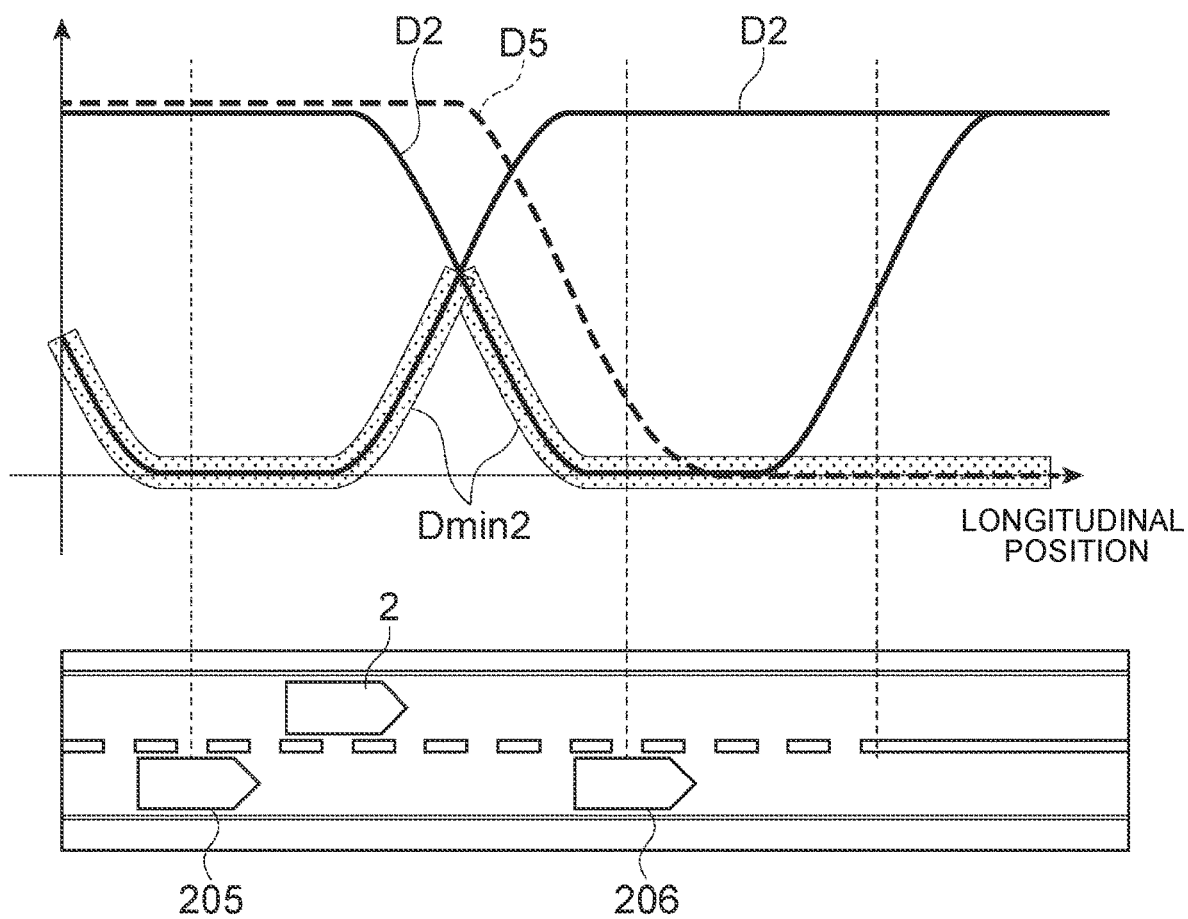
FIG. 9 is a diagram showing an example of combining instruction time distribution components.

FIG. 8 and FIG. 9 are diagrams showing examples of combining instruction time distribution components. FIG. 8 shows a remote instruction point situation in which, on a four-lane road where a lane change is legally allowed, the autonomous driving vehicle 2 is traveling in the right lane, other vehicles 203 and 204 diagonally behind the autonomous driving vehicle 2 are traveling in the left lane, and the autonomous driving vehicle 2 needs to change lanes from the right lane to the left lane in order to reach the destination along the target route. In such a remote instruction point situation, FIG. 8 shows an example of an instruction time distribution when the type of the remote instruction is a lane change of the autonomous driving vehicle 2 to the left lane. The horizontal axis in FIG. 8 indicates the longitudinal position along the traveling direction of the target route of the autonomous driving vehicle 2, and the vertical axis in FIG. 8 indicates the instruction time distribution index at each longitudinal position.

The situation shown in FIG. 8 can be considered as a situation in which the situation shown in FIG. 6 is applied to the situation of each of the other vehicles 203 and 204 and the resulting situations are superimposed with each other. Therefore, in FIG. 8, instruction time distribution component D2, which is the instruction time distribution component for one other vehicle 200 shown in FIG. 6, is applied to the respective positions of the other vehicles 203 and 204. In the example in FIG. 8, the recommended time acquisition unit 43 uses the smaller value of the two acquired instruction time distribution components D2 and D2 to combine them into the instruction time distribution Dmin1 (shaded line in FIG. 8).

FIG. 9 shows a remote instruction point situation in which, on a four-lane road where a lane change is legally allowed, the autonomous driving vehicle 2 is traveling in the left lane, another vehicle 205 diagonally behind the autonomous driving vehicle 2 is traveling in the right lane, another vehicle 206 diagonally ahead of the autonomous driving vehicle 2 is traveling in the right lane, and the autonomous driving vehicle 2 needs to change lanes from the left lane to the right lane in order to reach the destination along the target route. In this remote instruction point situation, the autonomous driving vehicle 2 is approaching the section where a lane change is legally prohibited. In such a remote instruction point situation, FIG. 9 shows an example of an instruction time distribution when the type of the remote instruction is a lane change of the autonomous driving vehicle 2 to the right lane. The horizontal axis in FIG. 9 indicates the longitudinal position along the traveling direction of the target route of the autonomous driving vehicle 2, and the vertical axis in FIG. 9 indicates the instruction time distribution index at each longitudinal position.

The situation shown in FIG. 9 is basically the same as the superimposition of two instruction time distribution components D2 such as the those shown in FIG. 8. In addition, on the resulting superimposed distribution component, instruction time distribution component D5 (broken line in FIG. 9), which corresponds to the situation in which the driving vehicle 2 is about to approach the section where a lane change is legally prohibited, is superimposed. Therefore, in the example in FIG. 9, the recommended time acquisition unit 43 uses the smaller value of three acquired instruction time distribution components D2, D2, and D5 for combining them into the instruction time distribution Dmin2 (shaded line in FIG. 9). As a result, when compared with the distribution index value of the instruction time distribution Dmin1 in FIG. 8, the instruction time distribution Dmin2 in FIG. 9 is minimized for a remote instruction that is sent to the autonomous driving vehicle 2 for changing the lane to a position ahead of the other vehicle 206. That the distribution index value is minimum in this way indicates that many remote commanders CM recognize that the behavior for the autonomous driving vehicle 2 to change lanes to a position ahead of other vehicles 206 is inappropriate (or there is a feeling of discomfort) and that this recognition is reflected in the instruction time distribution Dmin2.

Instead of using the smaller value of a plurality of acquired instruction time distribution components, the recommended time acquisition unit 43 may combine the instruction time distribution components by calculating the product of the values of a plurality of acquired instruction time distribution components. In this case, the plurality of acquired instruction time distribution components may be normalized each as a positive real number having a maximum value of 1.

Figure 10:
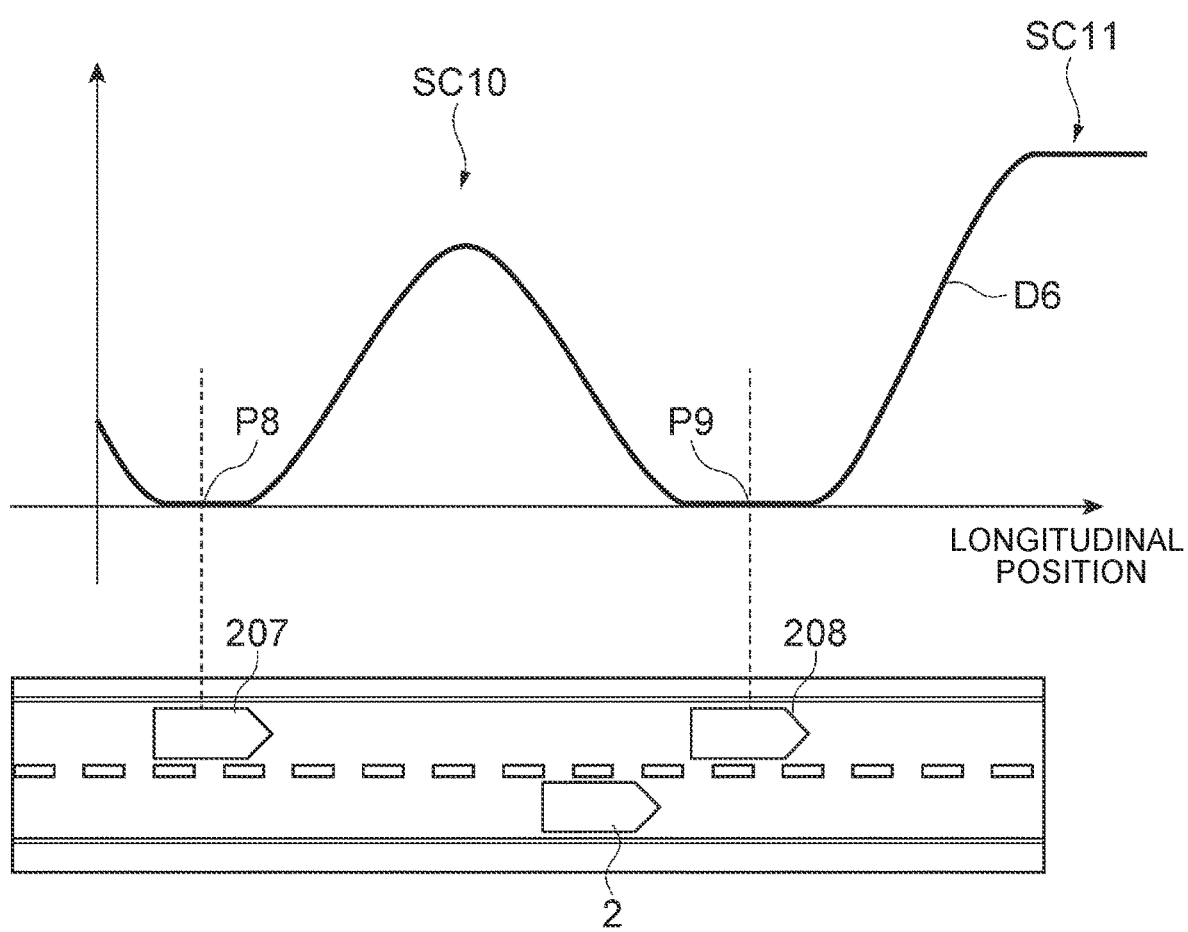
FIG. 10 is a diagram showing an example of an instruction time distribution.
Figure 11:
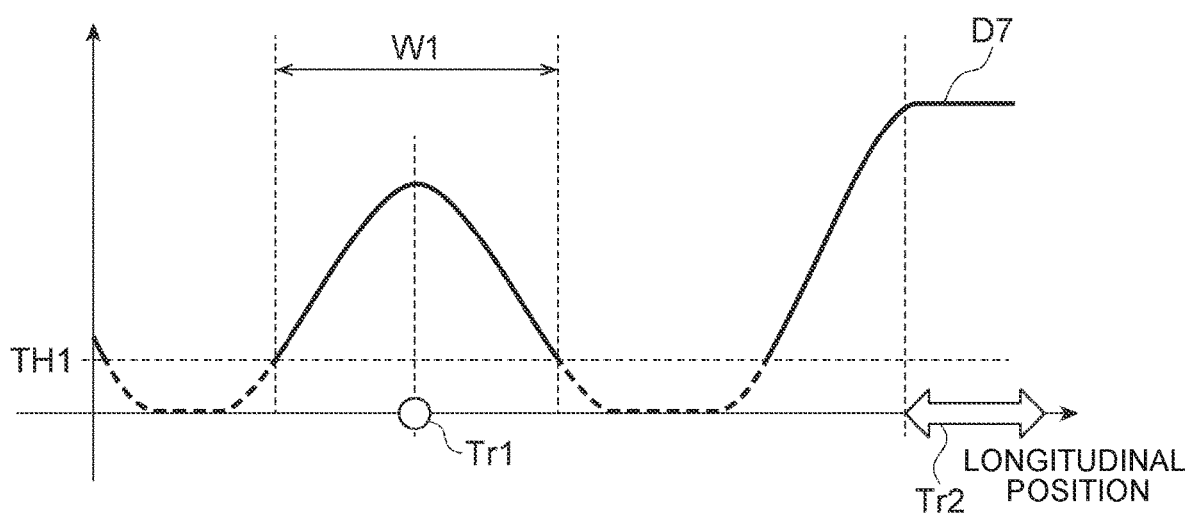
FIG. 11 is a diagram showing an example of a recommended time in the distribution in FIG. 10.

The recommended time acquisition unit 43 sets a recommended time based on the acquired instruction time distribution. An example of setting a recommended time will be described with reference to FIG. 10 and FIG. 11. FIG. 10 is a diagram showing an example of an instruction time distribution. FIG. 11 is a diagram showing an example of a recommended time in the distribution shown in FIG. 10.

FIG. 10 and FIG. 11 show a remote instruction point situation in which, on a four-lane road where a lane change is legally allowed, the autonomous driving vehicle 2 is traveling in the right lane, another vehicle 207 diagonally behind the autonomous driving vehicle 2 is traveling in the left lane, another vehicle 208 diagonally ahead of the autonomous driving vehicle 2 is traveling in the left lane, and the autonomous driving vehicle 2 needs to change lanes from the right lane to the left lane in order to reach the destination along the target route. In such a remote instruction point situation, FIG. 10 shows an example of an instruction time distribution (generated by combination) when the type of the remote instruction is a lane change of the autonomous driving vehicle 2 to the left lane. The horizontal axis in FIG. 10 and FIG. 11 indicates the longitudinal position along the traveling direction of the target route of the autonomous driving vehicle 2, and the vertical axis in FIG. 10 and FIG. 11 indicates the instruction time distribution index at each longitudinal position.

In instruction time distribution D6 in FIG. 10, the distribution index value is maximum in section SC11. For example, the recommended time acquisition unit 43 may set recommended time Tr2 (see FIG. 11) in section SC11 in which the distribution index value is maximum in instruction time distribution D6.

For example, when there is section SC10 between a pair of positions, P8 and P9, where the distribution index value becomes substantially minimum in instruction time distribution D6, the recommended time acquisition unit 43 may set a section in section SC10 as a setting allowable section W1 as shown in FIG. 11. The setting allowable section W1 is a section where the distribution index value is equal to or more than the predetermined threshold TH1 as shown in FIG. 11. The setting allowable section W1 is a section in which the recommended time may statistically be set. The predetermined threshold TH1 is the threshold of the distribution index for determining the setting allowable section.

In the example in FIG. 11, a part of instruction time distribution D6 in FIG. 10 where the distribution index value is equal to or more than the predetermined threshold TH1 is indicated by a solid line as instruction time distribution D7. The setting allowable section W1 is a section between a pair of end points having a distribution index value equal to the threshold value TH1. The setting allowable section W1 corresponds to a part of instruction time distribution D7 that exhibits an upwardly convex curved shape.

The recommended time acquisition unit 43 may set the recommended time as the time corresponding to at least one of the average, median, mode, and maximum of instruction time distribution D7 in the setting allowable section W1. In the example in FIG. 11, instruction time distribution D7 in the setting allowable section W1 is a symmetric distribution with recommended time Tr1 corresponding to all of the average, median, mode, and maximum. On the other hand, when the instruction time distribution in the setting allowable section has a biased distribution unlike the instruction time distribution in the example of shown in FIG. 11, the recommended time may need to correspond to one of the average, median, mode, and maximum.

The communication delay prediction unit 44 predicts a communication delay corresponding to a remote instruction point situation based on the map information and the remote instruction point situation. A communication delay is a delay that occurs in communication between the remote instruction device 1 and the autonomous driving vehicle 2. The communication delay prediction unit 44 predicts a communication delay corresponding to a remote instruction point situation on the target route, for example, based on the remote instruction point situation on the target route, recognized by the remote instruction point situation recognition unit 42, and the map information. For example, the communication delay prediction unit 44 predicts a communication delay, corresponding to the remote instruction point situation, from the start position of the remote instruction point situation recognized by the remote instruction point situation recognition unit 42 based on the target route of the autonomous driving vehicle 2 and the map information.

The communication delay prediction unit 44 predicts a communication delay from the start position of the remote instruction point situation, for example, by referring to the communication delay map data in which a position on the map is associated with a communication delay in advance. The method of generating the communication delay map data is not particularly limited. The communication delay map data may be generated, for example, by recording a communication delay between an information-collecting probe vehicle and the remote instruction device 1 in association with the position of the probe vehicle. The communication delay map data may also be generated or updated using a communication delay between each of a plurality of autonomous driving vehicles 2 (instead of the information-collecting probe vehicle) and the remote instruction device 1 and the position information on the autonomous driving vehicle 2.

The method of measuring a communication delay is not particularly limited and a known method may be used. As a communication delay, a Round Trip Time (RTT), which is a round trip time of a packet between the autonomous driving vehicle 2 and the remote instruction device 1, may be used. Since a communication delay includes a stochastic delay (queuing delay and the like), the average or maximum value of the RTTs at a predetermined time may be calculated for each position on the map or for each fixed section. In this case, the calculated value is regarded as the communication delay at that time for the position or for the section.

The predicted time calculation unit 45 calculates a predicted time at which a remote instruction will be reflected on the autonomous driving vehicle 2, based on the external environment of the autonomous driving vehicle 2, the type of the remote instruction, and the actual instruction time of the remote instruction (instruction time). The actual instruction time means the instruction time of a remote instruction when the vehicle remote instruction system 100 is put in practical use. The actual instruction time is, for example, an instruction time that is based on the time at which a remote commander CM enters a remote instruction to the instruction input unit 3b of the commander interface 3. The predicted time is a time at which a remote instruction is predicted to be reflected on the autonomous driving vehicle 2 based on the actual instruction time.

The predicted time is not a time at which a remote instruction is actually reflected on the autonomous driving vehicle 2 but is a time estimated by adding various delay times to the actual instruction time. The predicted time calculation unit 45 can calculate a predicted time, for example, as a time at which the autonomous driving vehicle 2 is controlled according to a remote instruction entered at the actual instruction time and, as a result, the autonomous driving vehicle 2 performs a predetermined behavior. The predetermined behavior may be thought of, for example, as the behavior that is performed at the recommended time.

The predicted time calculation unit 45 may calculate a predicted time in consideration of a response delay of the autonomous driving vehicle 2 that depends on the external environment of the autonomous driving vehicle 2 and the type of the remote instruction. The response delay of the autonomous driving vehicle 2 in this case means a delay in the operation response of the actuator 26 that may occur depending on the external environment of the autonomous driving vehicle 2 and the type of the remote instruction. The predicted time calculation unit 45 may change the predicted time in the remote instruction point situation in such a way that the predicted time is delayed from the actual instruction time for a time determined according to a response delay of the autonomous driving vehicle 2 that is set in advance. Note that the predicted time calculation unit 45 may calculate the predicted time assuming that there is no response delay of the autonomous driving vehicle 2. In this case, the predicted time is the same as the actual instruction time.

The predicted time calculation unit 45 may calculate the predicted time in consideration of a communication delay. The predicted time calculation unit 45 changes the predicted time in a remote instruction point situation according to the communication delay corresponding to the remote instruction point situation predicted by the communication delay prediction unit 44. For example, the predicted time calculation unit 45 delays the predicted time in the remote instruction point situation for a longer time when the communication delay is equal to or greater than the allowable threshold than when the communication delay is less than the allowable threshold. The predicted time calculation unit 45 may delay the predicted time for a longer time as the communication delay increases. The allowable threshold is a communication delay threshold that is set in advance.

The traveling situation information acquisition unit 46 receives a request to send a remote instruction and acquires the traveling situation information on the autonomous driving vehicle 2 when the autonomous driving vehicle 2 requests the remote instruction server 10 to send the remote instruction. The traveling situation information includes, for example, the captured image in front of the autonomous driving vehicle 2. A remote commander CM can recognize the situation of the autonomous driving vehicle 2 based on the traveling situation information.

The information providing unit 47 provides a remote commander CM with the information on the autonomous driving vehicle 2 to which a remote instruction is to be sent. The information providing unit 47 provides various information to the remote commander CM by controlling the information output unit 3a of the commander interface 3.

The information providing unit 47 provides to a remote commander CM with the traveling situation information on the autonomous driving vehicle 2, for example, acquired by the traveling situation information acquisition unit 46. For example, the information providing unit 47 displays the captured image in front of the autonomous driving vehicle 2 on the display of the information output unit 3a of the commander interface 3. The information providing unit 47 may convert, via viewpoint conversion, an image to an image viewed from the driver's seat of the autonomous driving vehicle 2 and display the converted image. The information providing unit 47 may display the image of the areas to the sides of and behind the autonomous driving vehicle 2. The information providing unit 47 may display a panoramic image generated by combining the images of the surroundings of the autonomous driving vehicle 2 or may display an overhead image generated through image combination and viewpoint conversion so as to look down on the autonomous driving vehicle 2. The information providing unit 47 may highlight an object in the image (for example, a frame may be displayed around another vehicle or the like). When a traffic light is included in the image, the information providing unit 47 may display the recognition result of the lighting state of the traffic light on the display.

The information providing unit 47 may display not only an image captured by the camera of the autonomous driving vehicle 2 but also various types of information on the display. The information providing unit 47 may use text or icons to display the situation of the autonomous driving vehicle 2 that has requested a remote instruction (for example, a situation in which the autonomous driving vehicle 2 turns right at an intersection or a situation in which the autonomous driving vehicle 2 performs offset avoidance for an obstacle). The information providing unit 47 may display the types of remote instructions (proceed, standby, and the like), selectable by a remote commander CM, on the display. The information providing unit 47 may display the information on an object detected by the radar sensor of the autonomous driving vehicle 2. The information on an object may be displayed as an icon in an overhead image. The information providing unit 47 may display the map information on the area around the autonomous driving vehicle 2, acquired based on the position information on the autonomous driving vehicle 2, on the display.

The information providing unit 47 may display the state of the autonomous driving of the autonomous driving vehicle 2 on the display. The state of autonomous driving is, for example, the state in which the vehicle is waiting for an instruction, the state in which the vehicle is decelerating to a stop, or the like. The information providing unit 47 may highlight the presence of a crosswalk or the like. The information providing unit 47 may display a detailed description of the situation in text form, such as "Be careful about oncoming vehicles and pedestrians and give an indication to proceed when you are ready to turn right."

The information providing unit 47 may provide a remote commander CM with sound information through the speaker of the information output unit 3a of the commander interface 3. The information providing unit 47 may output the situation of the autonomous driving vehicle 2 (for example, a situation in which the autonomous driving vehicle 2 turns right at an intersection or a situation in which the autonomous driving vehicle 2 performs offset avoidance for an obstacle) from the speaker as voices. The information providing unit 47 may output an approach of another vehicle or the like around the autonomous driving vehicle 2 from the speaker as sounds or voices. In addition, when the information output unit 3a has a vibration actuator, the information providing unit 47 may provide the information to a remote commander CM by vibration.

When a remote commander CM enters a remote instruction to the instruction input unit 3b of the commander interface 3, the remote instruction sending unit 48 sends the entered remote instruction to the autonomous driving vehicle 2. The remote instruction sending unit 48 sends the remote instruction to the autonomous driving vehicle 2 via the network N.

The remote instruction sending unit 48 sends a remote instruction to the autonomous driving vehicle 2 based on the recommended time and the predicted time so that the reflection time, at which the remote instruction is reflected on the autonomous driving vehicle 2, approaches the recommended time. The reflection time is a conceptual time at which a remote instruction is actually reflected on the autonomous driving vehicle 2 at an actual instruction time.

When the predicted time is earlier than the recommended time, the remote instruction sending unit 48 sends the delay instruction to the autonomous driving vehicle 2. The delay instruction is an instruction, which is sent to the autonomous driving vehicle 2, to set the reflection time closer to the recommended time by setting the reflection time later than the predicted time. For example, the delay instruction may be an instruction that delays the operation start time of a controlled device, such as the actuator 26 of the autonomous driving vehicle 2, so that the operation start time becomes a predetermined time later when the delay instruction is sent than when the delay instruction is not sent. The delay instruction in this case may be an instruction separate from a remote instruction and executed simultaneously with the remote instruction or may be an instruction included in a remote instruction and executed simultaneously with the remote instruction. Alternatively, the delay instruction may be an instruction that is executed at a time different from the remote instruction execution time by setting the time at which a remote instruction is sent from the remote instruction sending unit 48 to the autonomous driving vehicle 2 a predetermined time later when the delay instruction is sent than when the delay instruction is not sent.

The remote instruction sending unit 48 determines whether the predicted time is earlier than the recommended time, for example, based on the recommended time, acquired by the recommended time acquisition unit 43, and the predicted time predicted by the predicted time calculation unit 45. When the remote instruction sending unit 48 determines that the predicted time is earlier than the recommended time, the remote instruction sending unit 48 sends the delay instruction to the autonomous driving vehicle 2.

More specifically, examples of devices controlled by the delay instruction are as following. For example, when starting the autonomous driving vehicle 2 that has been stopped, the controlled devices include the drive device (that performs the drive operation) and the brake device (that performs the brake release operation) of the autonomous driving vehicle 2. When the autonomous driving vehicle 2 is an autonomous driving bus, the controlled devices include the automatic door device (that performs the door opening/closing operation of the autonomous driving bus after the bus stops at a stop according to the arrival time and the departure time at the stop that are determined in advance as the operation schedule) and the drive device (that performs the drive operation of the autonomous driving vehicle 2 for departure from a stop) of the autonomous driving vehicle 2. In addition, the devices controlled by the delay instruction include autonomous driving devices (that perform the road-shoulder pull-over operation, the right/left turn operation, or the lane change operation) using the actuator 26 of the autonomous driving vehicle 2 as well as the audio output device and the video output device mounted on the autonomous driving vehicle 2.

On the other hand, when the predicted time is later than the recommended time, the remote instruction sending unit 48 sends the preparation instruction to the autonomous driving vehicle 2. The preparation instruction is an instruction sent to the autonomous driving vehicle 2 to cause the autonomous driving vehicle to behave in response to the type of a remote instruction at an earlier time. The preparation instruction may be an instruction that, for example, eliminates an interspace (unused space) between the mechanical elements in advance so that the operation start time of a device, such as the actuator 26 of the autonomous driving vehicle 2, becomes earlier when the preparation instruction is sent than when the preparation instruction is not sent.

The remote instruction sending unit 48 determines whether the predicted time is later than the recommended time, for example, based on the recommended time, acquired by the recommended time acquisition unit 43, and the predicted time predicted by the predicted time calculation unit 45. More specifically, the remote instruction sending unit 48 may determine that the predicted time is later than the recommended time if a remote commander CM does not enter a remote instruction even when the recommended time, acquired by the recommended time acquisition unit 43, has arrived. The remote instruction sending unit 48 may also determine that the predicted time is later than the recommended time if a remote commander CM does not enter a remote instruction even after the recommended time, acquired by the recommended time acquisition unit 43, has passed. When the remote instruction sending unit 48 determines that the predicted time is later than the recommended time, the remote instruction sending unit 48 sends the preparation instruction to the autonomous driving vehicle 2. The preparation instruction in this case may be, for example, an instruction executed simultaneously with the remote instruction as an instruction different from the remote instruction or may be an instruction included in the remote instruction and executed simultaneously with the remote instruction.

Devices controlled by the preparation instruction may be, for example, the same as the devices controlled by the delay instruction described above. Examples of devices controlled by the preparation instruction include the following. For example, when starting the autonomous driving vehicle 2 that has been stopped, the controlled devices include the brake device (that performs an operation to reduce the braking force to such an extent that the autonomous driving vehicle 2 does not start) of the autonomous driving vehicle 2. When decelerating the autonomous driving vehicle 2 while it is traveling, the controlled devices include the brake device (that performs an operation to apply a hydraulic pressure of the hydraulic brake to such an extent that the autonomous driving vehicle 2 is not decelerated) of the autonomous driving vehicle 2. When the autonomous driving vehicle 2 is an autonomous driving bus, the controlled devices include the automatic door device and the entrance door device (that perform an operation to apply air pressure to the air piston to such an extent that the door of the autonomous driving bus is not opened or closed) of the autonomous driving vehicle 2. The remote instruction sending unit 48 may determine whether the predicted time is later than the recommended time in consideration of the preparation required time required for the device, controlled by the preparation instruction, to enter the pre-determined ready state. The preparation required time may be a predetermined time (for example, several milliseconds) that is set in advance according to the device controlled by the preparation instruction. For example, the preparation required time may be the time required from the time when the pressurizing instruction for pressing the piston of the brake device is given as the preparation instruction to the time when a desired pressure is actually applied. The remote instruction sending unit 48 may also determine that predicted time is later than the recommended time when no remote instruction is entered from a remote commander CM even at a time that is a preparation required time earlier than the recommended time acquired by the recommended time acquisition unit 43.

Note that, when the autonomous driving vehicle 2 is an autonomous driving bus, the remote instruction sending unit 48 does not need to send the delay instruction for a remote instruction that outputs audio and visual guidance information about destinations and traffic transfers. Similarly, the remote instruction sending unit 48 does not need to send the delay instruction for a remote instruction that brings the vehicle to an emergency stop.

Figure 12:
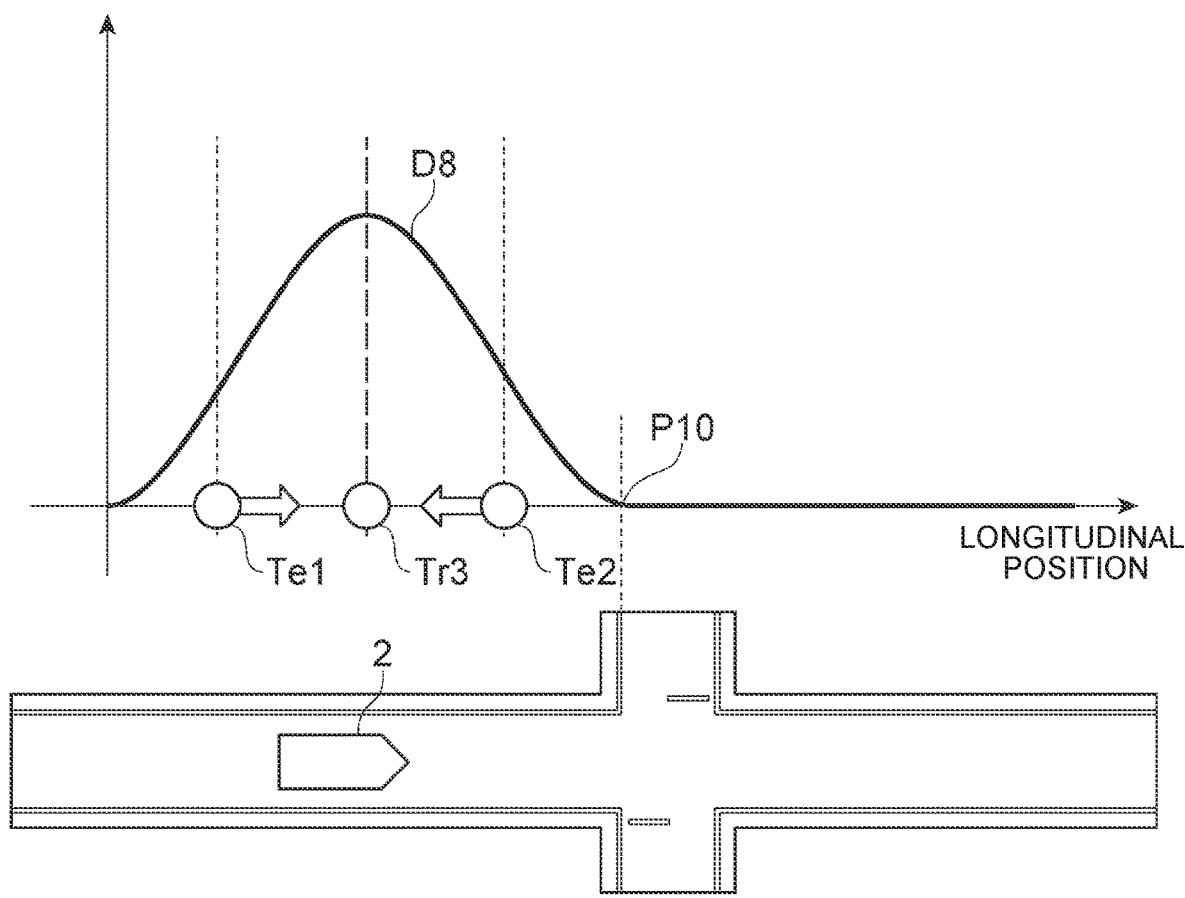
FIG. 12 is a diagram showing an example of the operation of a delay instruction and a preparation instruction.
Figure 13:
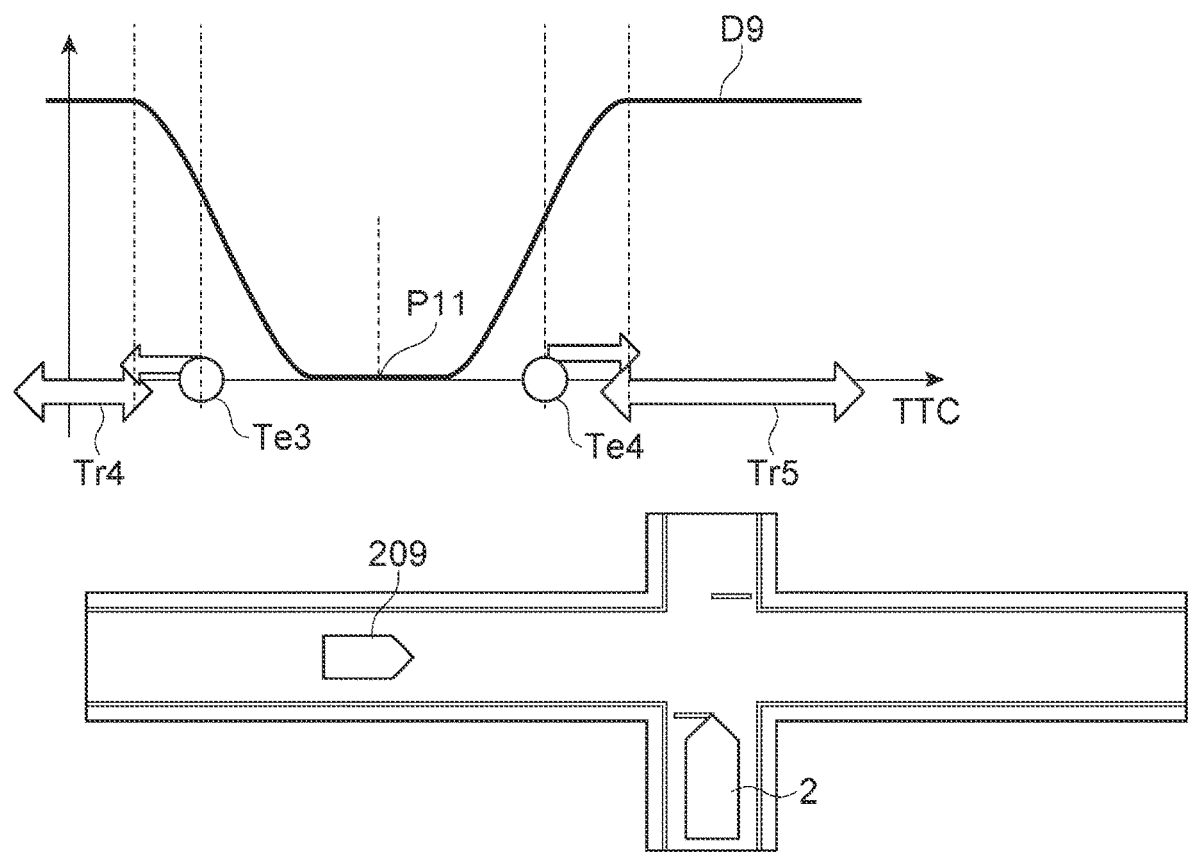
FIG. 13 is a diagram showing an example of the operation of a delay instruction and a preparation instruction.

The operation of the delay instruction and the preparation instruction sent by the remote instruction sending unit 48 will be described with reference to FIG. 12 to FIG. 14. FIG. 12 and FIG. 13 show examples of the operation of the delay instruction and the preparation instruction. FIG. 14 shows an example of the operation of the preparation instruction.

FIG. 12 shows a remote instruction point situation in which the autonomous driving vehicle 2 enters an intersection with poor visibility and without a traffic light. FIG. 12 shows instruction time distribution D8 that is an instruction time distribution when, in the remote instruction point situation described above, the type of the remote instruction is an instruction to stop the autonomous driving vehicle 2 at entrance position P10 at the intersection. The horizontal axis in FIG. 12 indicates the longitudinal position along the traveling direction of the target route of the autonomous driving vehicle 2, and the vertical axis in FIG. 12 indicates the instruction time distribution index at each longitudinal position.

In the example in FIG. 12, recommended time Tr3 for stopping the autonomous driving vehicle 2 at entrance position P10 is, for example, the mode in instruction time distribution D8. In this case, when a remote commander CM enters a remote instruction with predicted time Te1 that is earlier than recommended time Tr3, the remote instruction sending unit 48 sends the delay instruction. This delay instruction causes the autonomous driving vehicle 2, which has received the remote instruction with predicted time Te1, to perform the actual behavior at a later time as indicated by the right pointing arrow in the figure. As the result, the reflection time of the autonomous driving vehicle 2 is set closer to recommended time Tr3 when the delay instruction is sent than when the delay instruction is not sent. It should be noted that the reflection time of the autonomous driving vehicle 2 does not necessarily have to be recommended time Tr3. It is only required that the reflection time be set at least closer to recommended time Tr3 than to predicted time Te1.

On the other hand, when a remote commander CM does not enter a remote instruction even after recommended time Tr3 has passed, the remote instruction sending unit 48 sends the preparation instruction. This preparation instruction causes the autonomous driving vehicle 2, which has received the preparation instruction, to perform the actual behavior at an earlier time as indicated by the left pointing arrow in the figure. In this case, if a remote instruction is entered by a remote commander CM after recommended time Tr3 has passed but the preparation instruction is not sent, it is assumed that the reflection time of the autonomous driving vehicle 2 corresponds to predicted time Te2. Therefore, when the preparation instruction is sent, the reflection time of the autonomous driving vehicle 2 is set closer to recommended time Tr3 than to predicted time Te2. It should be noted that the reflection time of the autonomous driving vehicle 2 does not necessarily have to be recommended time Tr3. It is only required that the reflection time be set at least closer to recommended time Tr3 than to predicted time Te2.

The description of the example in FIG. 12 applies also to the case when the autonomous driving vehicle 2 is in a remote instruction point situation in which the autonomous driving vehicle 2 enters an intersection with poor visibility and without a traffic light and when the type of the remote instruction is an instruction to decelerate the autonomous driving vehicle 2 to entrance position P10 at the intersection.

FIG. 13 shows a remote instruction point situation in which, at an intersection without a traffic light where the autonomous driving vehicle 2 is temporarily stopped before entering the intersection, another vehicle 209 traveling on a priority road that intersects at the intersection is approaching. FIG. 13 shows instruction time distribution D9 that is an instruction time distribution when the type of the remote instruction in such a remote instruction point situation is an instruction to start the autonomous driving vehicle 2. The horizontal axis in FIG. 13 indicates the TTC of the autonomous driving vehicle 2 with respect to the other vehicle 209 (TTC in relation to position P11 of the other vehicle 209) and the vertical axis of FIG. 13 indicates the instruction time distribution index for each TTC. For the sake of description, in FIG. 13, it is assumed that the TTC when the autonomous driving vehicle 2 and the other vehicle 209 are in the illustrated positional relationship corresponds to the origin position on the horizontal axis, that the TTC when the vehicle 209 is closest to the autonomous driving vehicle 2, which is stopped, corresponds to position P11 on the horizontal axis, and that the TTC when the other vehicle 209 passes in front of, and moves away from, the autonomous driving vehicle 2 corresponds to the right side of position P11 on the horizontal axis.

In the example in FIG. 13, recommended times Tr4 and Tr5 for the autonomous driving vehicle 2 to start are, for example, the maximum value in instruction time distribution D9. In this case, when a remote commander CM does not enter a remote instruction even after recommended time Tr4 has passed, the remote instruction sending unit 48 sends the preparation instruction. This preparation instruction causes the autonomous driving vehicle 2, which has received the preparation instruction, to perform the actual behavior at an earlier time as indicated by the left pointing arrow in the figure. In this case, if a remote instruction is entered by a remote commander CM after recommended time Tr4 has passed but the preparation instruction is not sent, it is assumed that the reflection time of the autonomous driving vehicle 2 corresponds to predicted time Te3. Therefore, when the preparation instruction is sent, the reflection time of the autonomous driving vehicle 2 is set closer to recommended time Tr4 than to predicted time Te3. It should be noted that the reflection time of the autonomous driving vehicle 2 does not necessarily have to be recommended time Tr4. It is only required that the reflection time be set at least closer to recommended time Tr4 than to predicted time Te3.

On the other hand, when a remote commander CM enters a remote instruction with predicted time Te4 that is earlier than recommended time Tr5, the remote instruction sending unit 48 sends the delay instruction. This delay instruction causes the autonomous driving vehicle 2, which has received the remote instruction with predicted time Te4, to perform the actual behavior at a later time as indicated by the right pointing arrow in the figure. As the result, the actual reflection time of the autonomous driving vehicle 2 is set closer to recommended time Tr5 when the delay instruction is sent than when the delay instruction is not sent. It should be noted that the reflection time of the autonomous driving vehicle 2 does not necessarily have to be recommended time Tr5. It is only required that the reflection time be set at least closer to recommended time Tr5 than to predicted time Te4.

The bottom part of FIG. 14 shows, by a solid line, a remote instruction point situation in which the autonomous driving vehicle 2, which is an autonomous driving bus, is stopped at the stop BS. The top part of FIG. 14 shows instruction time distribution D10 that is an instruction time distribution when, in the remote instruction point situation described above, the type of the remote instruction is an instruction to start the autonomous driving vehicle 2. The horizontal axis in the top part of FIG. 14 indicates time P12 at which the automatic door is closed and the following times, and the vertical axis in the top part of FIG. 14 indicates the instruction time distribution index at each time.

In the example in the top part of FIG. 14, recommended time Tr6 for starting the autonomous driving vehicle 2 is, for example, the maximum value in instruction time distribution D10. In this case, when a remote commander CM does not enter a remote instruction even after recommended time Tr6 has passed, the remote instruction sending unit 48 sends the preparation instruction. This preparation instruction causes the autonomous driving vehicle 2, which has received the preparation instruction, to perform the actual behavior at an earlier time as indicated by the left pointing arrow in the figure. In this case, if a remote instruction is entered by a remote commander CM after recommended time Tr6 has passed but the preparation instruction is not sent, it is assumed that the reflection time of the autonomous driving vehicle 2 corresponds to predicted time Te5. Therefore, when the preparation instruction is sent, the reflection time of the autonomous driving vehicle 2 is set closer to recommended time Tr6 than to predicted time Te5. It should be noted that, instead of recommended time Tr6, recommended time Tr7, which is the median in instruction time distribution D10, may be used.

Assume that a situation element in which another vehicle 210 that is indicated by the broken line and is traveling diagonally behind the autonomous driving vehicle 2 is approaching is further superimposed on the remote instruction point situation indicated by the solid line in the bottom part of FIG. 14. The middle part of FIG. 14 shows instruction time distribution D11 that is the instruction time distribution when the type of the remote instruction is to start the autonomous driving vehicle 2 in consideration of the other vehicle 210. The horizontal axis in the middle part of FIG. 14 indicates the TTC of the autonomous driving vehicle 2 with respect to the other vehicle 210 (TTC in relation to position P13 of the other vehicle 210) and the vertical axis in the middle part of FIG. 14 indicates the instruction time distribution index for each TTC. For the sake of description, in the middle part of FIG. 14, it is assumed that the TTC when the autonomous driving vehicle 2 and the other vehicle 210 are in the illustrated positional relationship corresponds to the origin position on the horizontal axis, that the TTC when the longitudinal position of the autonomous driving vehicle 2 and the longitudinal position of the other vehicle 210 are positionally the same corresponds to position P13 on the horizontal axis, and that the TTC when the other vehicle 210 passes by the autonomous driving vehicle 2 corresponds to the right side of position P13 on the horizontal axis.

The horizontal axis in the top part of FIG. 14 indicates the time, while the horizontal axis in the middle part of FIG. 14 indicates the TTC. When these instruction time distributions D10 and D11 are superimposed, the horizontal axis may be converted, for example, in such a way that one horizontal axis is adjusted to the other horizontal axis. For example, as a result of superimposition of instruction time distribution D10 on instruction time distribution D11, it is assumed that predicted time Te5 in the top part of FIG. 14 corresponds to predicted time Te6 in the middle part of FIG. 14 and that recommended time Tr6 in the top part of FIG. 14 is included in recommended time Tr8 in the middle part of FIG. 14.

In this case, when a remote commander CM does not enter a remote instruction even after recommended time Tr8 has passed, the remote instruction sending unit 48 sends the preparation instruction. This preparation instruction causes the autonomous driving vehicle 2, which has received the preparation instruction, to perform the actual behavior at an earlier time as indicated by the left pointing arrow in the figure. In this case, if a remote instruction is entered by a remote commander CM after recommended time Tr8 has passed but the preparation instruction is not sent, it is assumed that the reflection time of the autonomous driving vehicle 2 corresponds to predicted time Te6. Therefore, when the preparation instruction is sent, the reflection time of the autonomous driving vehicle 2 is set closer to recommended time Tr8 than to predicted time Te6.

Processing of Vehicle Remote Instruction System in First Embodiment

Figure 15:
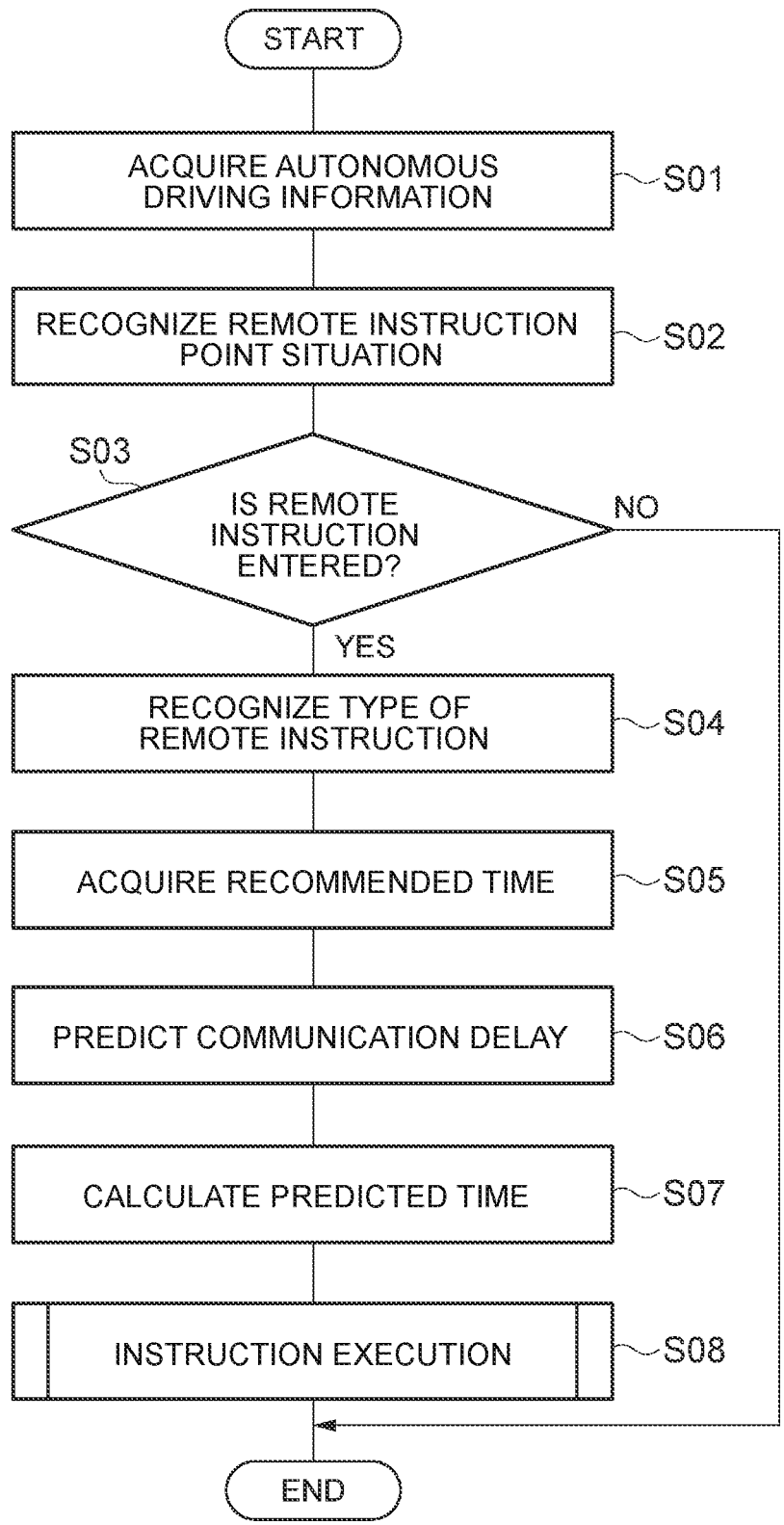
FIG. 15 is a flowchart showing an example of the processing of the remote instruction device in FIG. 4.

Next, the processing of the vehicle remote instruction system 100 in the first embodiment will be described. FIG. 15 is a flowchart showing an example of the processing of the remote instruction device 1 in FIG. 4. The processing in FIG. 15 is started, for example, when the remote instruction request determination unit 34 of the autonomous driving vehicle 2, which is traveling under control of the remote instruction device 1, determines that a remote instruction should be requested and requests the remote instruction server 10 to send a remote instruction.

As shown in FIG. 15, in S01, the remote instruction device 1 of the vehicle remote instruction system 100 acquires the autonomous driving information using the autonomous driving information acquisition unit 41. The autonomous driving information acquisition unit 41 acquires the autonomous driving information sent from the autonomous driving vehicle 2. The autonomous driving information includes the position information on the autonomous driving vehicle 2 and the target route of the autonomous driving vehicle 2.

In S02, the remote instruction device 1 uses the remote instruction point situation recognition unit 42 to recognize a remote instruction point situation. The remote instruction point situation recognition unit 42 recognizes the remote instruction point situation on the target route, for example, based on the position on the autonomous driving vehicle 2, the target route of the autonomous driving vehicle 2, the external environment of the autonomous driving vehicle 2, and the map information.

In S02, the remote instruction device 1 may use the information providing unit 47 to provide the traveling situation information on the autonomous driving vehicle 2 to a remote commander. The information providing unit 47 may provide the traveling situation information on the autonomous driving vehicle 2 to a remote commander CM. The information providing unit 47 may provide the information, for example, by displaying the captured image in front of the autonomous driving vehicle 2 on the display of the information output unit 3a of the commander interface 3.

In S03, the remote instruction device 1 uses the recommended time acquisition unit 43 to determine whether a remote instruction is entered by a remote commander CM. The recommended time acquisition unit 43 determines whether a remote instruction is entered by a remote commander CM based on whether a remote commander CM has entered a remote instruction from the instruction input unit 3b of the commander interface 3. When the remote instruction device 1 determines that a remote commander CM has entered a remote instruction (S03: YES), the processing proceeds to S04. When the remote instruction device 1 does not determine that the remote commander CM has entered a remote instruction (S03: NO), the remote instruction device 1 terminates the current processing.

In S04, the remote instruction device 1 uses the recommended time acquisition unit 43 to recognize the type of the remote instruction. The recommended time acquisition unit 43 recognizes the type of the remote instruction based on the input to the instruction input unit 3b of the commander interface 3 entered by the remote commander CM.

In S05, the remote instruction device 1 uses the recommended time acquisition unit 43 to acquire the recommended time. The recommended time acquisition unit 43 acquires a recommended time that is set in advance with a predetermined time from the start to the end of the remote instruction point situation as the reference point, for example, based on the remote instruction point situation and the type of the remote instruction.

In S06, the remote instruction device 1 uses the communication delay prediction unit 44 to predict a communication delay. The communication delay prediction unit 44 predicts a communication delay from the start position of the remote instruction point situation, for example, by referring to the communication delay map data in which a position on the map is associated in advance with a communication delay.

In S07, the remote instruction device 1 uses the predicted time calculation unit 45 to calculate the predicted time. The predicted time calculation unit 45 calculates the predicted time, at which the remote instruction will be reflected on the autonomous driving vehicle 2, based on the external environment of the autonomous driving vehicle 2, the type of the remote instruction, and the actual instruction time of the remote instruction. The predicted time calculation unit 45 may calculate the predicted time including the communication delay.

Figure 16:
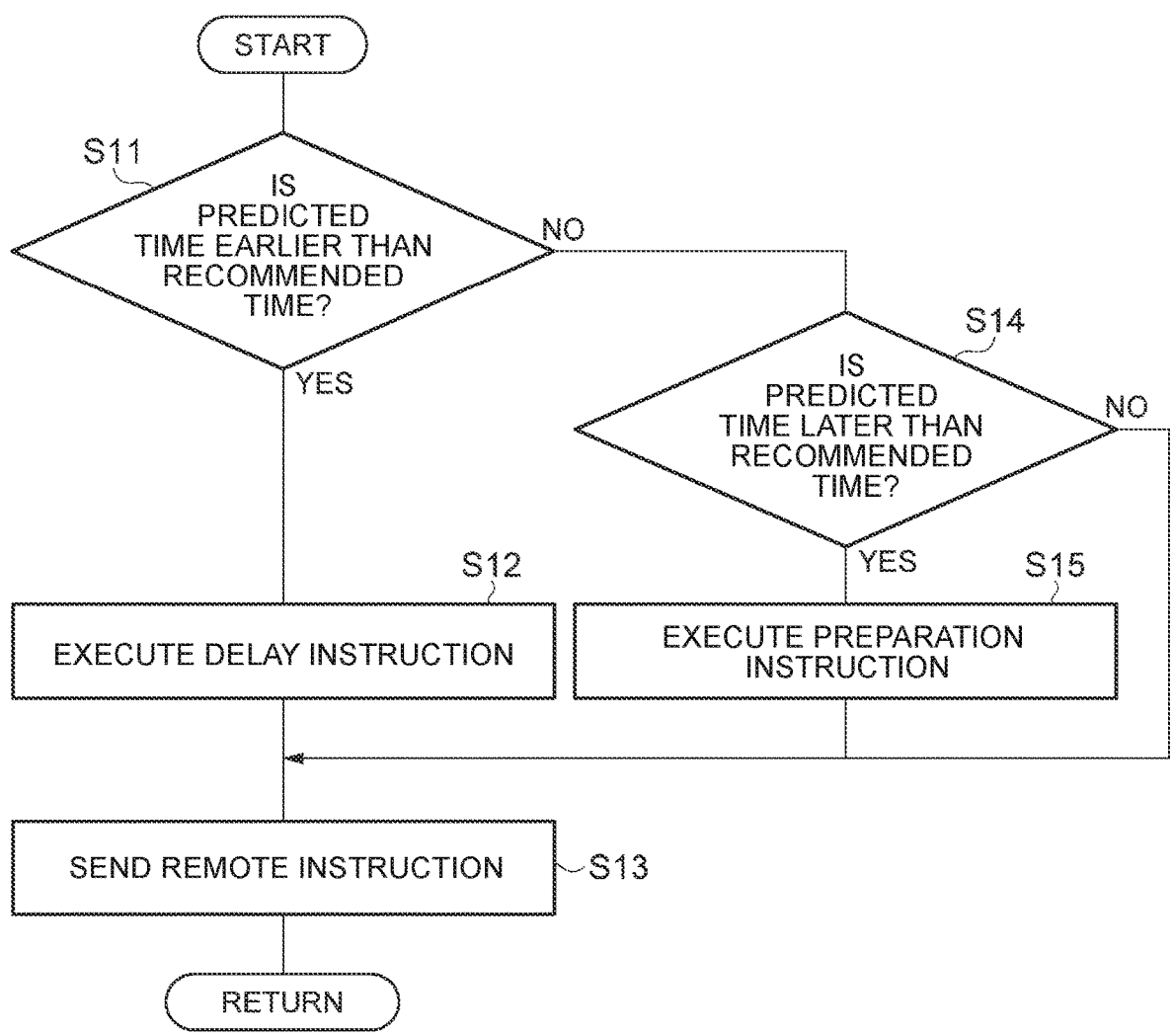
FIG. 16 is a flowchart showing an example of the execution processing of the instruction in FIG. 15.

In S08, the remote instruction device 1 uses the remote instruction sending unit 48 to perform the instruction execution processing for the autonomous driving vehicle 2. More specifically, the processing shown in FIG. 16 is performed as the instruction execution processing, FIG. 16 is a flowchart showing an example of the instruction execution processing in FIG. 15. In S11, the remote instruction device 1 uses the remote instruction sending unit 48 to determine whether the predicted time is earlier than the recommended time as shown in FIG. 16. When the remote instruction sending unit 48 determines that the predicted time is earlier than the recommended time (S11: YES), the processing of the remote instruction device 1 proceeds to S12.

In S12, the remote instruction device 1 uses the remote instruction sending unit 48 to execute the delay instruction for the autonomous driving vehicle 2 and, in S13, sends the remote instruction to the autonomous driving vehicle 2. After that, the current processing is terminated.

On the other hand, when the remote instruction device 1 does not determine that the predicted time is earlier than the recommended time (S11: NO), the remote instruction device 1 uses the remote instruction sending unit 48 in S14 to determine whether the predicted time is later than the recommended time. More specifically, when a remote instruction is not entered by a remote commander CM even when the recommended time, acquired by the recommended time acquisition unit 43, is reached, the remote instruction sending unit 48 determines that the predicted time is later than the recommended time. When a remote instruction is not entered by a remote commander CM even after the recommended time, acquired by the recommended time acquisition unit 43, has passed, the remote instruction sending unit 48 may determine that the predicted time is later than the recommended time. When the remote instruction sending unit 48 determines that the predicted time is later than the recommended time (S14: YES), the processing of the remote instruction device 1 proceeds to S15.

In S15, the remote instruction device 1 uses the remote instruction sending unit 48 to execute the preparation instruction for the autonomous driving vehicle 2 and, in S13, sends the remote instruction to the autonomous driving vehicle 2. After that, the current processing is terminated.

On the other hand, when the remote instruction sending unit 48 does not determine that the predicted time is later than the recommended time (S14: NO), the processing of the remote instruction device 1 proceeds to S13. In S13, the remote instruction device 1 uses the remote instruction sending unit 48 to send the remote instruction to the autonomous driving vehicle 2. After that, the current processing is terminated.

Effect of Vehicle Remote Instruction System in First Embodiment

According to the vehicle remote instruction system 100 in the first embodiment described above, the recommended time is set in advance based on a remote instruction point situation and the type of a remote instruction. The recommended time is a time at which the remote instruction is reflected on the autonomous driving vehicle 2 and is an appropriate time that suits the external environment of the autonomous driving vehicle 2. In addition, the predicted time, at which the remote instruction is predicted to be reflected on the autonomous driving vehicle 2, is calculated based on the external environment of the autonomous driving vehicle 2, the type of the remote instruction, and the generation time or the sending time of the remote instruction. When the predicted time is earlier than the recommended time, the delay instruction is sent to set the reflection time, at which the remote instruction is reflected on the autonomous driving vehicle 2, closer to the recommended time than to the predicted time. As a result, the reflection time is set at a later time so that the reflection time is set closer to the recommended time when the delay instruction is sent than when the delay instruction is not sent. On the other hand, when the predicted time is later than the recommended time, the preparation instruction is sent to cause the autonomous driving vehicle 2 to behave in response to the type of the remote instruction at an earlier time. The autonomous driving vehicle 2 behaves in response to the type of the remote instruction at an earlier time when the preparation instruction is sent than when the preparation instruction is not sent. As a result, the reflection time is set closer to the recommended time. Therefore, it is possible to reduce a deviation of the reflection time, at which the remote instruction is reflected on the autonomous driving vehicle 2, from the appropriate time that suits the external environment of the autonomous driving vehicle 2.

The vehicle remote instruction system 100 further includes the communication delay prediction unit 44 that predicts a communication delay corresponding to a remote instruction point situation based on the map information and the remote instruction point situation. The predicted time calculation unit 45 calculates a predicted time that includes a communication delay. Therefore, the calculation accuracy of the predicted time increases, further reducing a deviation of the reflection time from the recommended time.

Second Embodiment

Figure 17:
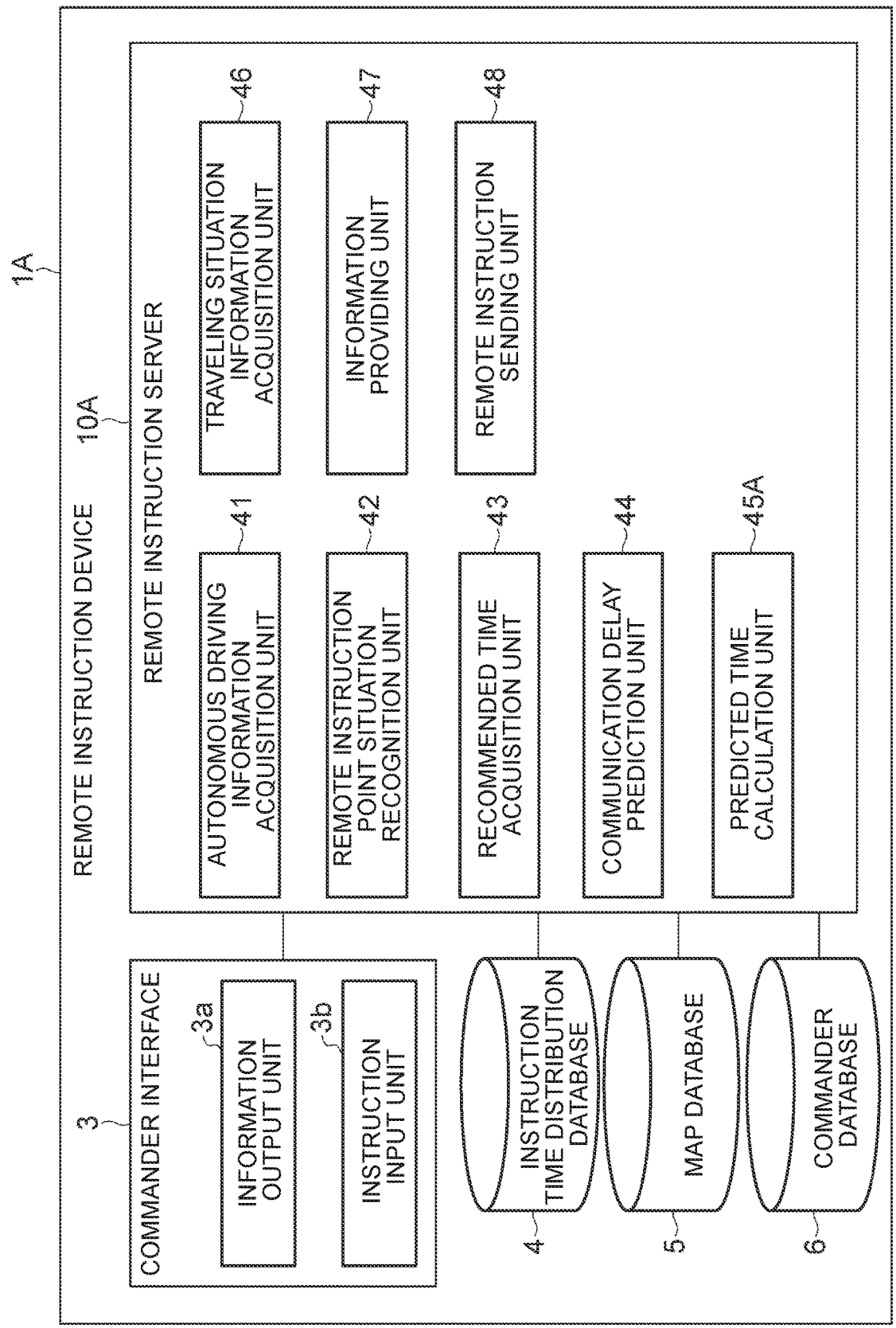
FIG. 17 is a block diagram showing an example of a remote instruction device in a vehicle remote instruction system according to a second embodiment.

Next, a vehicle remote instruction system according to a second embodiment will be described. FIG. 17 is a block diagram showing an example of a remote instruction device 1A in the vehicle remote instruction system according to the second embodiment. The configuration of the vehicle remote instruction system according to the second embodiment is the same as that of the vehicle remote instruction system according to the first embodiment except the remote instruction device 1A. For the components of the remote instruction device 1A common to those in the first embodiment, the same reference numeral is used to denote the same component and a redundant description is omitted.

Configuration of Remote Instruction Device in Second Embodiment

More specifically, as shown in FIG. 17, the remote instruction device 1A is different from the remote instruction device 1 in the first embodiment in that a commander database 6 is further included. In addition, the remote instruction server 10A is different from the remote instruction server 10 in the first embodiment in that a predicted time calculation unit 45A has a function that is added to the predicted time calculation unit 45.

The commander database 6 is a database that stores the commander tendency information and the remote commander CM information. The remote commander CM information includes, for example, the personal identification information on remote commanders CM. The commander database 6 stores the commander tendency information in advance in association with the remote commanders CM.

The commander tendency information is the information on whether a remote commander CM tends to enter a remote instruction earlier or later than the recommended time. As the commander tendency information, the information on whether a remote commander CM tends to enter a remote instruction earlier or later than the recommended time may be acquired in advance by an experiment or a simulation, for example, based on the recommended time that is desk calculated according to the remote instruction point situation and the type of the remote instruction.

The predicted time calculation unit 45A calculates a predicted time also based on the commander tendency information. The predicted time calculation unit 45A acquires the personal identification information on a remote commander CM, for example, based on the input of a remote instruction entered by the remote commander CM. The personal identification information on a remote commander CM may be associated with the identification number of the commander interface 3, for example, by assigning the commander interface 3 to the remote commander CM. The predicted time calculation unit 45A may acquire the personal identification information on a remote commander CM based on the identification number of the commander interface 3 from which the remote commander CM has entered a remote instruction. In this way, the predicted time calculation unit 45A acquires the commander tendency information based on the personal identification information on the remote commander CM.

For example, when the commander tendency information indicates that the entry time at which a remote commander CM enters a remote instruction tends to be earlier than the recommended time, the predicted time calculation unit 45A may calculate the predicted time in such a way that the predicted time is set earlier by a predetermined first correction value. This makes it easier for the remote instruction sending unit 48 to send the delay instruction. On the other hand, when the commander tendency information indicates that the entry time at which a remote commander CM enters a remote instruction tends to be later than the recommended time, the predicted time calculation unit 45A may calculate the predicted time in such a way that the predicted time is set later by a predetermined second correction value. This makes it easier for the remote instruction sending unit 48 to send the preparation instruction. Note that the first correction value and the second correction value are correction values for correcting the predicted time according to the commander tendency information.

Figure 18:
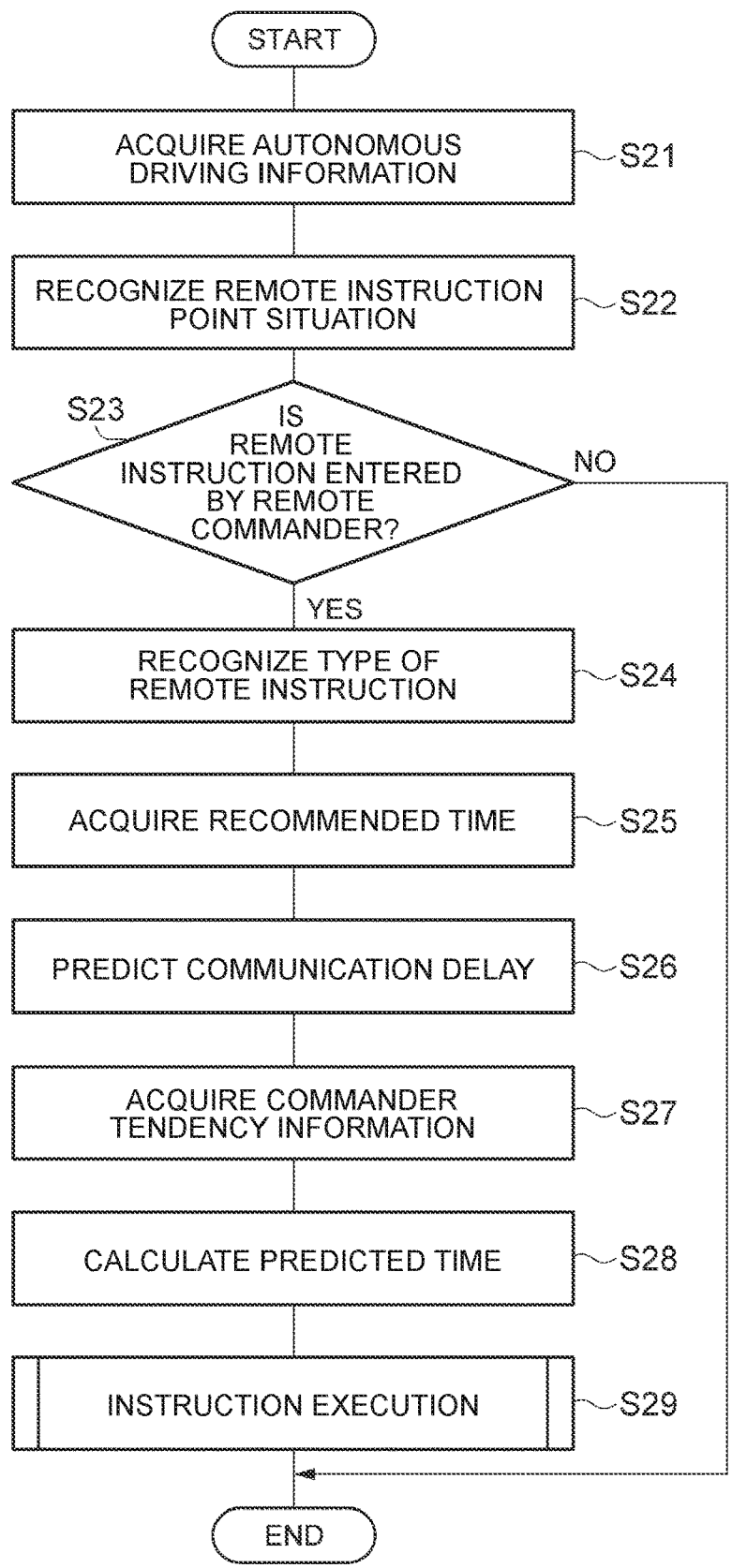
FIG. 18 is a flowchart showing an example of the processing of the remote instruction device in FIG. 17.

Processing of Remote Instruction Device in Vehicle Remote Instruction System in Second Embodiment Next, the processing of the remote instruction device 1A in the vehicle remote instruction system according to the second embodiment will be described with reference to FIG. 18. FIG. 18 is a flowchart showing an example of the processing of the remote instruction device 1A in FIG. 17.

As shown in FIG. 18, the processing of the remote instruction device 1A according to the second embodiment is different from the processing of the remote instruction device 1 according to the first embodiment in that S27 is added and in that the processing in S28 includes additional processing for the commander tendency information acquired in S27. The processing in S21 to S26 is the same as the processing in S01 to S06, respectively, and the processing in S29 is the same as the processing in S08.

In S27, the remote instruction device 1A uses the predicted time calculation unit 45A to acquire the commander tendency information. The predicted time calculation unit 45A acquires the personal identification information on a remote commander CM, for example, based on the input of a remote instruction entered by the remote commander CM. The predicted time calculation unit 45A acquires the commander tendency information based on the personal identification information on the remote commander CM.

In S28, the remote instruction device 1A uses the predicted time calculation unit 45A to calculate the predicted time. The predicted time calculation unit 45A calculates the predicted time also based on the commander tendency information. For example, when the commander tendency information indicates that the entry time at which a remote commander CM enters a remote instruction tends to be earlier than the recommended time, the predicted time calculation unit 45A calculates the predicted time in such a way that the predicted time is set earlier by a predetermined first correction value. On the other hand, when the commander tendency information indicates that the entry time at which a remote commander CM enters a remote instruction tends to be later than the recommended time, the predicted time calculation unit 45A calculates the predicted time in such a way that the predicted time is set later by a predetermined second correction value.

Effect of Vehicle Remote Instruction System in Second Embodiment

The vehicle remote instruction system (remote instruction device 1A) according to the second embodiment described above further includes the instruction input unit 3b and the commander database 6. The instruction input unit 3b is used by a remote commander CM to enter a remote instruction according to the situation of the autonomous driving vehicle 2. The commander database 6 stores the commander tendency information, which indicates whether a remote instruction entered by a remote commander CM tends to be earlier or later than the recommended time, in association with the remote commander CM. The predicted time calculation unit 45A calculates the predicted time also based on the commander tendency information. Therefore, since the predicted time is calculated also based on the commander tendency information, it is possible to reduce a deviation of the reflection time from the recommended time that is caused due to the tendency of the remote commanders CM.

Modification

While the embodiments of the present disclosure have been described above, it is to be understood that the present disclosure is not limited to the specific embodiments described above. The present disclosure can be implemented not only by the embodiments described above but also in a variety of modes in which various changes and modifications are added based on the knowledge of those skilled in the art.

For example, the remote instruction sending unit 48 need not necessarily send the preparation instruction to the autonomous driving vehicle 2 when the predicted time is later than the recommended time. The remote instruction sending unit 48 is at least required to send the delay instruction to the autonomous driving vehicle 2 when the predicted time is earlier than the recommended time.

For example, when a remote commander CM does not enter a remote instruction even when the current time reaches the recommended time, the remote instruction sending unit 48 may send the preparation instruction to the autonomous driving vehicle 2 at the time when the current time reaches the recommended time. Alternatively, when a remote commander CM does not enter a remote instruction even when the current time reaches a time that is a predetermined time earlier than the recommended time, the remote instruction sending unit 48 may send the preparation instruction to the autonomous driving vehicle 2 at that time. The predetermined time in this case may correspond to a difference in response time between when the preparation instruction is sent and when the preparation instruction is not sent. In other words, the remote instruction sending unit 48 may send the preparation instruction in advance at a time earlier than the recommended time when the reflection time is predicted to be later than the recommended time if the preparation instruction is not sent. In such a case, the determination processing in S03 in FIG. 15 and in S23 in FIG. 18 may be omitted.

The remote instruction devices 1 and 1A do not necessarily need to have the commander interface 3. That is, a remote instruction does not necessarily have to be entered by a remote commander CM. In this case, when a remote instruction request is received from the autonomous driving vehicle 2, a remote instruction may be automatically generated in the remote instruction device 1 or 1A.

In the remote instruction device 1A, the instruction time distribution database 4 may be omitted, in which case the delay instruction may be sent based on the commander database 6. For example, when the time at which a remote instruction is entered by a remote commander CM tends to be earlier than the recommended time, the predicted time calculation unit 45A does not necessarily need to correct the predicted time but, instead, the delay instruction may be sent. Conversely, when the time at which a remote instruction is entered by a remote commander CM tends to be later than the recommended time, the predicted time calculation unit 45A does not necessarily need to correct the predicted time but, instead, the preparation instruction may be sent.

The remote instruction device 1 need not include the communication delay prediction unit 44. In this case, the processing in S06 in FIG. 15 and the processing in S26 in FIG. 18 are unnecessary. In this case, the predicted time calculation units 45 and 45A may calculate the predicted time without considering a communication delay.

Instead of the predicted value, the predicted time calculation unit 45 or 45A may calculate the predicted time based on a communication delay currently measured between the autonomous driving vehicle 2 and the remote instruction device 1 or 1A. For example, as a communication delay in this case, a queuing delay (congestion delay) may be used. To measure a queuing delay, an active measurement method, in which measurement packets are sent to the network for measuring a delay, may be used or a passive measurement method, in which a measurement apparatus or measurement software is installed on the network to monitor the communication status, may be used. In addition, a VPS method may be used in which the round-trip time (RTT: Round Trip Time) between the autonomous driving vehicle 2 and the remote instruction device 1 is measured for packets of various sizes. The RTT means the sum of the transmission delay corresponding to each packet size (delay depending on a packet size), propagation delay (delay depending on a physical path), and queuing delay (delay that varies stochastically). Since the measured minimum RTT is a delay that does not include the queuing delay (the sum of the transmission delay and the propagation delay), the following expression holds true: (observed RTT)−(minimum RTT) =queuing delay. In addition, various known methods may be used for measuring the current communication delay.

The remote instruction device 1 may have an ideal behavior database instead of the instruction time distribution database 4. The ideal behavior database stores the information on the ideal behaviors of the autonomous driving vehicle 2. An ideal behavior means that the behavior performed by the autonomous driving vehicle 2 that has received a remote instruction in a certain situation element is an appropriate behavior. That is, it can be understood that the ideal behavior database stores the information on the appropriate behaviors of the autonomous driving vehicle 2 that has received a remote instruction in a certain situation element (that is, the ideal behaviors of the autonomous driving vehicle 2) in the form of the behavior data on the autonomous driving vehicle 2. For example, as the behavior data, the vehicle speed, longitudinal acceleration, lateral acceleration, steering angle, yaw rate, and the like may be used. In this case, the recommended time acquisition unit 43 acquires the recommended time based on the behavior data stored in the ideal behavior database. The recommended time acquisition unit 43 may acquire the recommended time by performing back calculation from the behavior data, for example, in consideration of the response speed of the actuator 26.

The predicted time calculation units 45 and 45A may modify the predicted time according to a change in the trajectory (autonomous driving path and vehicle speed plan) and/or a change in the target route of the autonomous driving vehicle 2. A change in the trajectory or in the target route is caused by various factors that cannot be predicted from the map information (such as the occurrence of a new traffic congestion after the calculation of the predicted time or a new effect produced by moving objects including other vehicles and pedestrians).

In the vehicle remote instruction system 100, the remote instruction server 10, instead of the autonomous driving vehicle 2, may determine whether a remote instruction is required. In this case, based on the traveling situation information acquired from the autonomous driving vehicle 2, the remote instruction server 10 determines whether the autonomous driving vehicle 2 is in a situation in which a remote instruction should be requested. When the remote instruction server 10 determines that the autonomous driving vehicle 2 is in a situation in which a remote instruction should be requested, the remote instruction server 10 may send the standby instruction to the autonomous driving vehicle 2 and may request a remote commander CM to enter a remote instruction.

The remote instruction devices 1 or 1A may be mounted on a vehicle. In this case, a remote commander CM is also in the vehicle. The remote instruction server 10 may be a cloud server composed of the ECUs of a plurality of vehicles.

The remote instruction request determination unit 34 of the autonomous driving vehicle 2 does not necessarily need to request to send a remote instruction even when the autonomous driving vehicle 2 is in a remote instruction point situation. When the reliability of autonomous driving is equal to or greater than the threshold, the remote instruction request determination unit 34 may determine that a remote instruction need not be requested. The reliability of autonomous driving can be obtained by a known method.

The autonomous driving vehicle 2 does not necessarily need to include the remote instruction request determination unit 34. The autonomous driving vehicle 2 may be configured not to request to send a remote instruction. In this case, according to the position of the autonomous driving vehicle 2 and the like, the remote instruction device 1 determines whether a remote instruction is required.

The vehicle remote instruction system 100 may not include the autonomous driving vehicle 2 as its component. In this case, the vehicle remote instruction system 100 corresponds to the remote instruction device 1 or 1A.

What is claimed is:

1. A vehicle remote instruction system in which a remote instruction for controlling an autonomous driving vehicle is sent, the vehicle remote instruction system comprising:
a remote instruction point situation recognition unit configured to recognize a remote instruction point situation on a target route of the autonomous driving vehicle based on the target route that is set in advance, position information on the autonomous driving vehicle, and map information;
a recommended time acquisition unit configured to acquire a recommended time, the recommended time being set in advance with a predetermined time from a start to an end of the remote instruction point situation as a reference point based on the remote instruction point situation and a type of the remote instruction;

a remote instruction sending unit configured to send the remote instruction to the autonomous driving vehicle; and a predicted time calculation unit configured to calculate a predicted time based on an external environment of the autonomous driving vehicle, the type of the remote instruction, and an instruction time of the remote instruction, the predicted time being a time at which the remote instruction is predicted to be reflected on the autonomous driving vehicle, wherein:

when the predicted time is earlier than the recommended time, the remote instruction sending unit is configured to send a delay instruction to the autonomous driving vehicle, the delay instruction being an instruction that sets a reflection time closer to the recommended time by setting the reflection time later than the predicted time, the reflection time being a time at which the remote instruction is reflected on the autonomous driving vehicle; or when the predicted time is later than the recommended time, the remote instruction sending unit is configured to send a preparation instruction to the autonomous driving vehicle, the preparation instruction being an instruction that causes the autonomous driving vehicle to behave in response to the type of the remote instruction at an earlier time.

2. The vehicle remote instruction system according to claim 1, the vehicle remote instruction system further comprising:

an instruction input unit configured to allow a remote commander to enter the remote instruction according to a situation of the autonomous driving vehicle; and a commander database configured to store, in advance, commander tendency information in association with the remote commander, the commander tendency information being information regarding whether the remote commander tends to enter the remote instruction earlier than or later than the recommended time, wherein the predicted time calculation unit is configured to calculate the predicted time also based on the commander tendency information.

3. The vehicle remote instruction system according to claim 1, the vehicle remote instruction system further comprising a communication delay prediction unit configured to predict a communication delay corresponding to the remote instruction point situation based on the map information and the remote instruction point situation, wherein the predicted time calculation unit is configured to calculate the predicted time that includes the communication delay.

* * * * *